US008675493B2

(12) United States Patent
Buddhikot et al.

(10) Patent No.: US 8,675,493 B2
(45) Date of Patent: Mar. 18, 2014

(54) ROUTING BANDWIDTH GUARANTEED PATHS WITH LOCAL RESTORATION IN LABEL SWITCHED NETWORKS

(75) Inventors: Milind M. Buddhikot, Cliffwood, NJ (US); Chandra S. Chekuri, Chatham, NJ (US); Katherine H. Guo, Eatontown, NJ (US); Li Li, Iselin, NJ (US)

(73) Assignee: Alcatel Lucent, Paris (FR)

( * ) Notice: Subject to any disclaimer, the term of this patent is extended or adjusted under 35 U.S.C. 154(b) by 2866 days.

(21) Appl. No.: 10/187,664

(22) Filed: Jul. 2, 2002

(65) Prior Publication Data
US 2004/0004938 A1 Jan. 8, 2004

(51) Int. Cl.
*H04L 12/28* (2006.01)
*G06F 11/07* (2006.01)

(52) U.S. Cl.
USPC ........... 370/238; 370/216; 370/228; 370/255; 370/400; 370/401

(58) Field of Classification Search
USPC ........... 370/216–400, 401, 410; 709/238, 339
See application file for complete search history.

(56) References Cited

U.S. PATENT DOCUMENTS

| | | | | |
|---|---|---|---|---|
| 4,615,011 A | * | 9/1986 | Linsker | 716/13 |
| 5,233,604 A | * | 8/1993 | Ahmadi et al. | 370/238 |
| 5,235,599 A | * | 8/1993 | Nishimura et al. | 714/4 |
| 5,497,368 A | * | 3/1996 | Reijnierse et al. | 370/351 |
| 5,787,271 A | * | 7/1998 | Box et al. | 714/4 |
| 6,016,306 A | * | 1/2000 | Le Boudec et al. | 370/235 |
| 6,047,331 A | * | 4/2000 | Medard et al. | 709/239 |
| 6,370,119 B1 | * | 4/2002 | Basso et al. | 370/252 |
| 6,633,544 B1 | * | 10/2003 | Rexford et al. | 370/238 |
| 6,646,989 B1 | * | 11/2003 | Khotimsky et al. | 370/238 |
| 6,657,965 B1 | * | 12/2003 | Shaffer et al. | 370/238 |
| 6,697,335 B1 | * | 2/2004 | Ergun et al. | 370/238 |
| 6,728,205 B1 | * | 4/2004 | Finn et al. | 370/217 |
| 6,778,531 B1 | * | 8/2004 | Kodialam et al. | 370/390 |
| 6,791,949 B1 | * | 9/2004 | Ryu et al. | 370/254 |
| 6,850,486 B2 | * | 2/2005 | Saleh et al. | 370/218 |
| 6,856,592 B2 | * | 2/2005 | Grover et al. | 370/216 |
| 6,856,627 B2 | * | 2/2005 | Saleh et al. | 370/397 |
| 6,912,221 B1 | * | 6/2005 | Zadikian et al. | 370/395.21 |
| 6,956,821 B2 | * | 10/2005 | Szviatovszki et al. | 370/237 |
| 6,977,931 B1 | * | 12/2005 | Hadziomerovic | 370/392 |
| 7,002,917 B1 | * | 2/2006 | Saleh | 370/238 |
| 7,058,016 B1 | * | 6/2006 | Harper | 370/238 |
| 7,075,892 B2 | * | 7/2006 | Grover et al. | 370/238 |
| 7,099,277 B2 | * | 8/2006 | Sahinoglu et al. | 370/238 |

(Continued)

OTHER PUBLICATIONS

Jonathan S Whalen,John Kenney,Finding Maximal Link Disjoint Paths in a Multigraph,IEEE,1990, pp. 0470-0474.*

(Continued)

*Primary Examiner* — Ayaz Sheikh
*Assistant Examiner* — Venkatesh Haliyur
(74) *Attorney, Agent, or Firm* — Wall & Tong, LLP

(57) ABSTRACT

A method of providing at least one restoration path for a primary routing path in a network. The method includes receiving a customer connection request to route information. Costs are assigned for the primary routing path, and the primary routing path is computed based upon the primary routing path costs. A backtracking distance over the primary routing path is determined, and costs for at least one restoration path are assigned. The at least one restoration path may then be computed based upon the at least one restoration path costs.

19 Claims, 16 Drawing Sheets

LOCAL RESTORATION WITH BACKTRACKING

(56) References Cited

U.S. PATENT DOCUMENTS

| | | | |
|---|---|---|---|
| 7,124,187 B1* | 10/2006 | Kodialam et al. | 709/226 |
| 7,319,700 B1* | 1/2008 | Kompella | 370/400 |
| 7,352,852 B1* | 4/2008 | Cocherl et al. | 379/114.02 |
| 7,428,212 B2* | 9/2008 | Saleh et al. | 370/228 |
| 2002/0018264 A1* | 2/2002 | Kodialam et al. | 359/128 |
| 2002/0067693 A1* | 6/2002 | Kodialam et al. | 370/216 |
| 2002/0141345 A1* | 10/2002 | Szviatovszki et al. | 370/238 |
| 2002/0150099 A1* | 10/2002 | Pung et al. | 370/390 |
| 2003/0021222 A1* | 1/2003 | Boer et al. | 370/216 |
| 2003/0031127 A1* | 2/2003 | Saleh et al. | 370/228 |
| 2003/0063613 A1* | 4/2003 | Carpini et al. | 370/401 |
| 2003/0142808 A1* | 7/2003 | Hollman et al. | 379/221.01 |
| 2003/0174717 A1* | 9/2003 | Zabarski et al. | 370/401 |
| 2003/0185209 A1* | 10/2003 | Lee | 370/390 |
| 2003/0193898 A1* | 10/2003 | Wong et al. | 370/252 |
| 2004/0004938 A1* | 1/2004 | Buddhikot et al. | 370/238 |

OTHER PUBLICATIONS

Alexander A Kist, Richard J Harris, A heuristic to Generate all Best Partially Disjoint Paths in a Communication Network, RMIT University, Melbourne, Box 2476V, VIC 3001, Australia. 6 pages.*

Murali Kodialam, T.V. Lakshman, Bell Laboratories, Lucent Technologies, "Dynamic Routing of Locally Restorable Bandwidth Guaranteed Tunnels using Aggregated Link Usage Information".

S. Ramanathan, "Multicast Tree Generation in Networks with Asymmetric Links".

Murali Kodialam, T.V. Lakshman, Bell Laboratories, Lucent Technologies, "Minimum Interference Routing with Applications to MPLS Traffic Engineering".

Moses Charikar, Chandra Chekuri, To-yat Cheung, Zuo Dai, Ashish Goel, Sudipto Guha, Ming Li, "Approximation Algorithms for Directed Steiner Problems".

Murali Kodialam, T.V. Lakshman, Bell Laboratories, Lucent Technologies, "Dynamic Routing of Bandwidth Guaranteed Tunnels with Restoration".

Samphel Norden, Milind M. Buddhikot, Marcel Waldvogel, Subhash Suri, "Routing Bandwidth Guaranteed Paths with Restoration in Label Switched Networks".

J.W. Suurballe, Bell Telephone Laboratories, Inc., "Disjoint Paths in a Network".

* cited by examiner

NAIVE LOCAL RESTORATION

LOCAL RESTORATION WITH BACKTRACKING

STEINER TREE

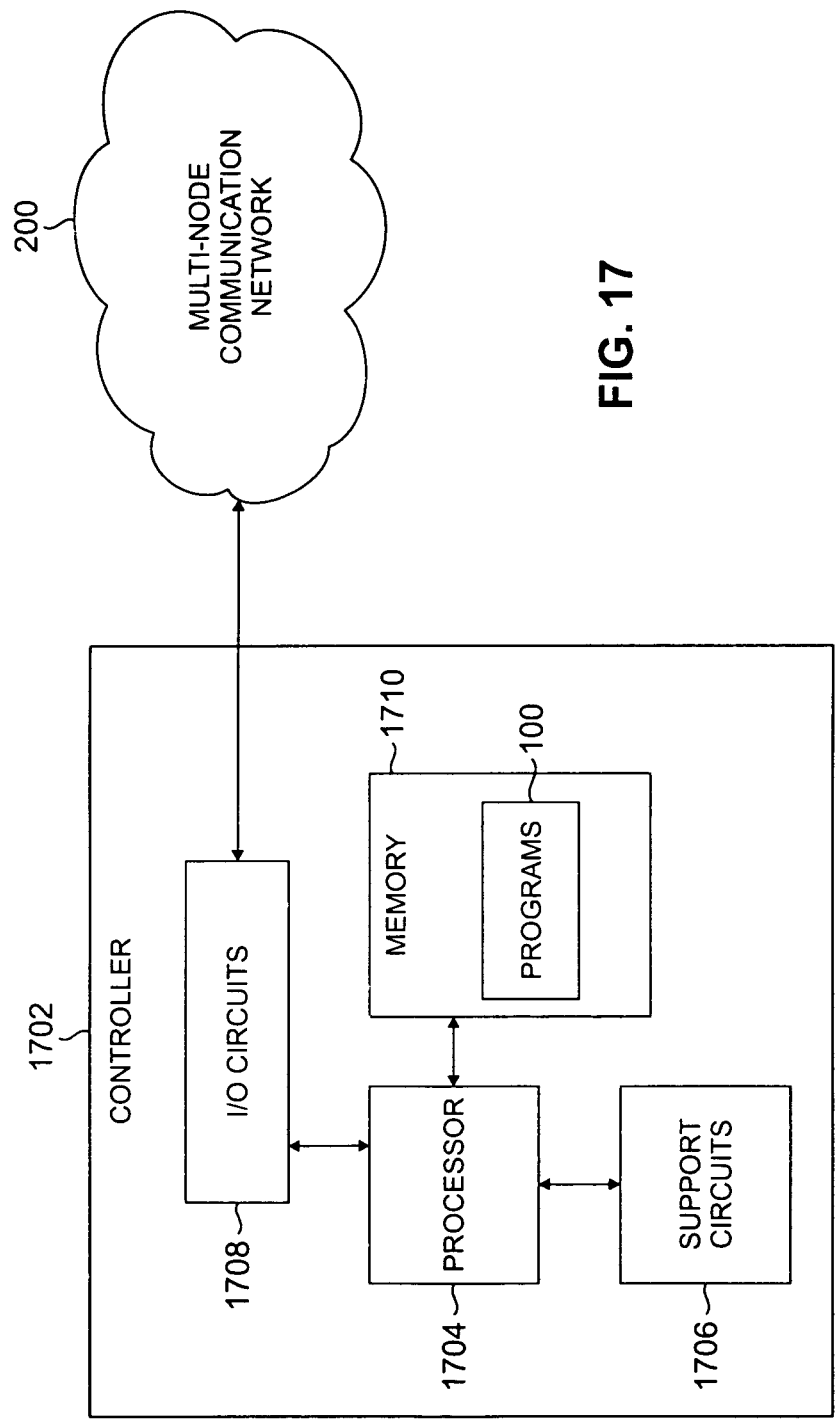

ROUTING BANDWIDTH GUARANTEED PATHS WITH LOCAL RESTORATION IN LABEL SWITCHED NETWORKS

FIELD OF INVENTION

The present invention relates to label switched networks. More specifically, the present invention relates to restoration of routing paths.

DESCRIPTION OF THE BACKGROUND ART

The emerging label switched networks, such as multi-protocol label switching (MPLS) networks and wavelength division multiplexing (WDM) networks, enable network service providers to route bandwidth guaranteed paths between customer sites. The basic label switched path (LPS) routing is often enhanced using restoration routing, which sets up alternate LSPs to guarantee uninterrupted network connectivity in case network links or nodes fail.

There are two variants of restoration routing. A first restoration technique is known as global (i.e., "end-to-end") restoration, which provides two disjoint paths between an ingress (source) node and an egress (destination) node. Resources are always reserved on the restoration path and are guaranteed to be available when the restoration path is activated. In an event of a failure along the primary path, the source node detects the failure in the primary path and activates the restoration path. In the absence of an explicit signaling protocol, the source node learns of link failures via intra-domain routing updates such as open shortest path first (OSPF) link state advertisements (LSA) packets or IS-IS Link State Packets (IS-IS LSP), which are processed in the slow-path typically in a routing daemon in the router or switch controller. Such packets are typically generated by timer driven events. This causes very large restoration latencies of the order of seconds or at best 100 s of milliseconds.

In particular, the restoration latency in the case of end-to-end restoration comprises the sum of three components. A first component is the amount of time elapsed before link owner node detects link failure. This is typically of the order of 100 s of microseconds. A second component is the time required for the OSPF or IS-IS routing daemon or fault propagation protocol daemon at the link owner to learn of the link failure and issue a routing update. A third component is the amount of time elapsed before routing or fault propagation protocol updates, which are sent by the link owner, propagate to the source node and a corrective action is taken. This delay depends on network topology and load and can be in the order of seconds. Accordingly, the second and third components of end-to-end restoration are variable and difficult to bound.

A second restoration technique is known as local restoration. Local restoration finds a set of restoration paths that protect the links along the primary path. Local restoration can minimize the need for the source node to be involved in the path restoration, and thereby achieve fast restoration. In particular, in a true local restoration scenario, the delay before corrective action is taken equals the amount of time elapsed before a link owner node detects the link failure. Accordingly, local restoration is attractive since it can meet stringent restoration latency requirements that are often of the order of 50 ms, which is similar to existing SONET protection mechanisms.

However, a link owner may not have capabilities of providing restoration during a link failure. That is, the node may not be designed to provide local restoration or the node may also fail in some manner as to render the node incapable of providing restoration. In this instance, the link owner node will notify the source node of the failure (e.g., using OSPF update messages) in a similar manner as described regarding global (end-to-end) restoration, thereby increasing the latency for routing a message Moreover, since the local restoration paths use links not on the primary path, additional bandwidth must be reserved that is normally not utilized. The additional bandwidth required is deemed an undesirable cost for providing redundancy. In particular, the additional bandwidth is not normally utilized or used only for low priority traffic, such as best-effort data and under fault conditions, thereby wasting valuable resources that may be otherwise utilized for bandwidth guaranteed data. Accordingly, a method of providing guaranteed bandwidth routing paths with local restoration utilizing minimum bandwidth usage is desirable to reduce the costs of routing information at an economy of scale.

SUMMARY OF THE INVENTION

The disadvantages heretofore associated with the prior art, are overcome by the present invention of a method of providing at least one restoration path for a primary routing path in a network. The method includes receiving a customer connection request to route information. Costs are assigned for the primary routing path, and the primary routing path is computed based upon the primary routing path costs.

A backtracking distance over the primary routing path is determined, and costs for at least one restoration path are assigned. The at least one restoration path may then be computed based upon the at least one restoration path costs. Post processing may then be performed to free excess bandwidth reserved on each restoration path and minimize bandwidth usage on each restoration path.

BRIEF DESCRIPTION OF THE DRAWINGS

The teachings of the present invention can be readily understood by considering the following detailed description in conjunction with the accompanying drawings, in which:

FIG. 17 depicts a high-level block diagram of a network manager suitable for use in the communications system of FIG. 2.

To facilitate understanding, identical reference numerals have been used, where possible, to designate identical elements that are common to the figures.

DETAILED DESCRIPTION OF THE INVENTION

Figure 1:
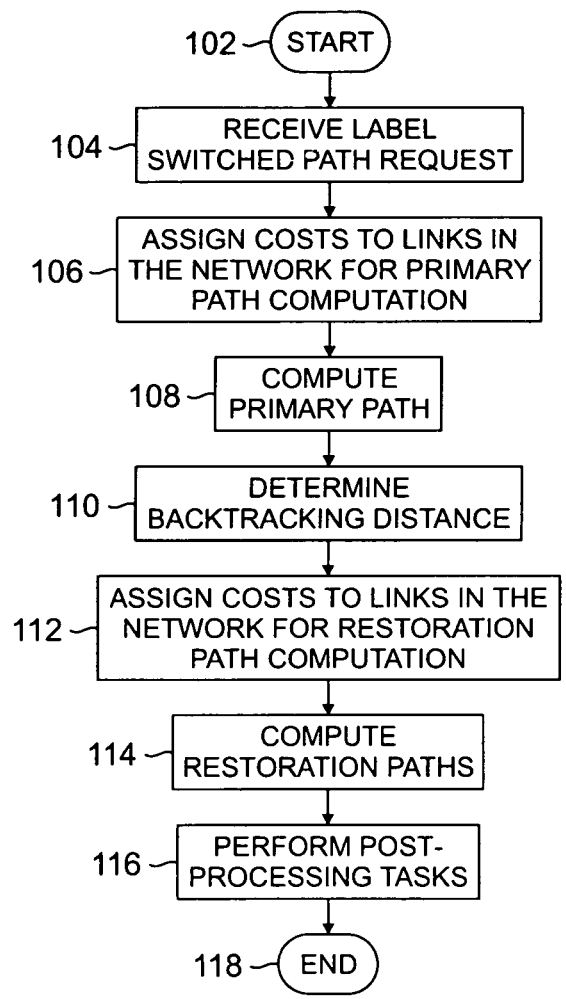
FIG. 1 depicts a flow diagram of a method of providing local restoration of the present invention.

The present invention provides local restoration routing that includes backtracking capabilities between nodes in a network. The inventive backtracking feature provides for the sharing of bandwidth of links and nodes between the restoration and primary paths. That is, the primary and restoration paths are not considered disjoint paths during local restoration routing. Backtracking is characterized by a single parameter called backtracking distance "D". The backtracking distances include instances where there is no backtracking (D=0), limited backtracking (D=k), and unlimited backtracking (D=∞).

The backtracking distance D is optimized to conform to the customer's requirements, which includes a tolerance level for restoration latency. That is, where a customer utilizing the network cannot tolerate (i.e., exceed) a restoration latency value during restoration from a link failure, then the backtracking distance D may be reduced or disabled. Conversely, where restoration latency is not critical for the customer requirements, a greater backtracking distance D may be established.

Providing joint optimization of a primary path and the restoration (i.e., backup) paths is considered difficult to obtain. For a new request by a customer to a particular network, ideally one would like to compute the primary path and the set of restoration paths such that the total cost is minimized, where backtracking does not exceed a particular "D" of hops.

As such, there are at least two characteristics of the joint optimization problem that make joint optimization difficult to solve (i.e., non-polynomial (NP) hard) in a finite time. The first characteristic is that for each edge, the costs associated with each edge depend on whether the edge is used for the primary path or the restoration path. It is noted that the terms edge and link may be used interchangeably. Second, the cost of a restoration link also depends on which set of primary links it protects. Given the intractable nature of the joint optimization problem, the present invention utilizes the computation of the primary and backup paths in two steps, which include a conservative cost function where a link used for computing the restoration paths, are assumed to protect every link in the primary path.

In the case where the backtracking distance of D=0 and D=k, the two-step optimization problem is still NP-hard regarding an optimal solution for computation of a backup path. As discussed in further detail below with regards to FIGS. 1 through 16, the present invention may use heuristics, which include per-link network states, to address the NP-hard optimization problem. The heuristics provide an approximation to the solution for optimal primary and restoration paths. The network states include residual link capacity ($R_l$), bandwidth consumed by primary paths ($F_l$) bandwidth consumed by backup paths ($A_l$), and optionally, a fixed-sized Backup Load Distribution (BLD) matrix. The algorithms used in the present invention offer a means to tradeoff bandwidth to meet a complete spectrum of customer restoration latency requirements.

It is noted that in the context of protected path routing, it is important to consider two kinds of failures, namely link failures and router failures. A common fault model for link failures is that at any given time only one link in the network fails. In other words, in the event of a link failure, no other link fails until the failed link is repaired. The present invention is discussed in terms of a single link failure, which is shown to be most common. Multi-link failures may be addressed by doing separate independent reservations of backup subgraphs that are link disjoint.

FIG. 1 depicts a flow diagram of a method 100 of providing local restoration of the present invention. It is noted that each of the steps of method 100 are discussed in further detail below, and should be viewed in conjunction with FIGS. 2 through 16. More specifically, method 100 provides a two-step process to first compute a primary path and then at least one backup path, where the primary and backup paths are optimized (i.e., post processed) to use a minimal amount of bandwidth and restoration latency.

Referring to FIG. 1, the method 100 begins at step 102 and proceeds to step 104, where an ingress router receives a label switched path (i.e., routing) request. At step 106, the ingress router assigns costs to links in the network for establishing a primary path for routing a signal (e.g., packetized information), and at step 108, the ingress router computes the primary path from the cost information of step 106.

The method 100 then proceeds to step 110, where the backtracking distance "D" is determined. Once the backtracking distance is determined for establishing the routing path, at step 112, the ingress router assigns costs to links in the network for establishing a restoration path in case a link in the primary path fails. At step 114, the ingress router computes a restoration path from the cost information of step 112. At step 116, the ingress router performs post processing to provide a set of potential restoration paths with minimum backtracking distance, and minimize the total bandwidth reserved on the restoration paths. The method 100 then proceeds to step 118, where method 100 ends.

The method 100 provides a two-step algorithm for providing an optimal primary path and restoration paths. The two-step algorithm may be further described below in Table 1.

TABLE 1

| A two-step algorithm |
|---|
| 1: Given graph G and request r = (s,d,r); |
| 2: P = WSPF(G, r); // Compute primary path using WSPF |
| 3: If (P=NULL) return reject; |
| 4: Switch (D) // Do backup path computation |
| 5:    case 0: |
| 6:      Gsub = modified_directed_Steiner(G,P,r); |
| 7: break; |
| 8:    case 1: |
| 9:      Gsub = Suurballe(G,P,r); |
| 10: break; |
| 11:    case k: |
| 12:      Gsub = modified_Suurballe(G,P,r,k); |
| 13: if (Gsub == NULL) return reject; |

TABLE 1-continued

Figure 2:
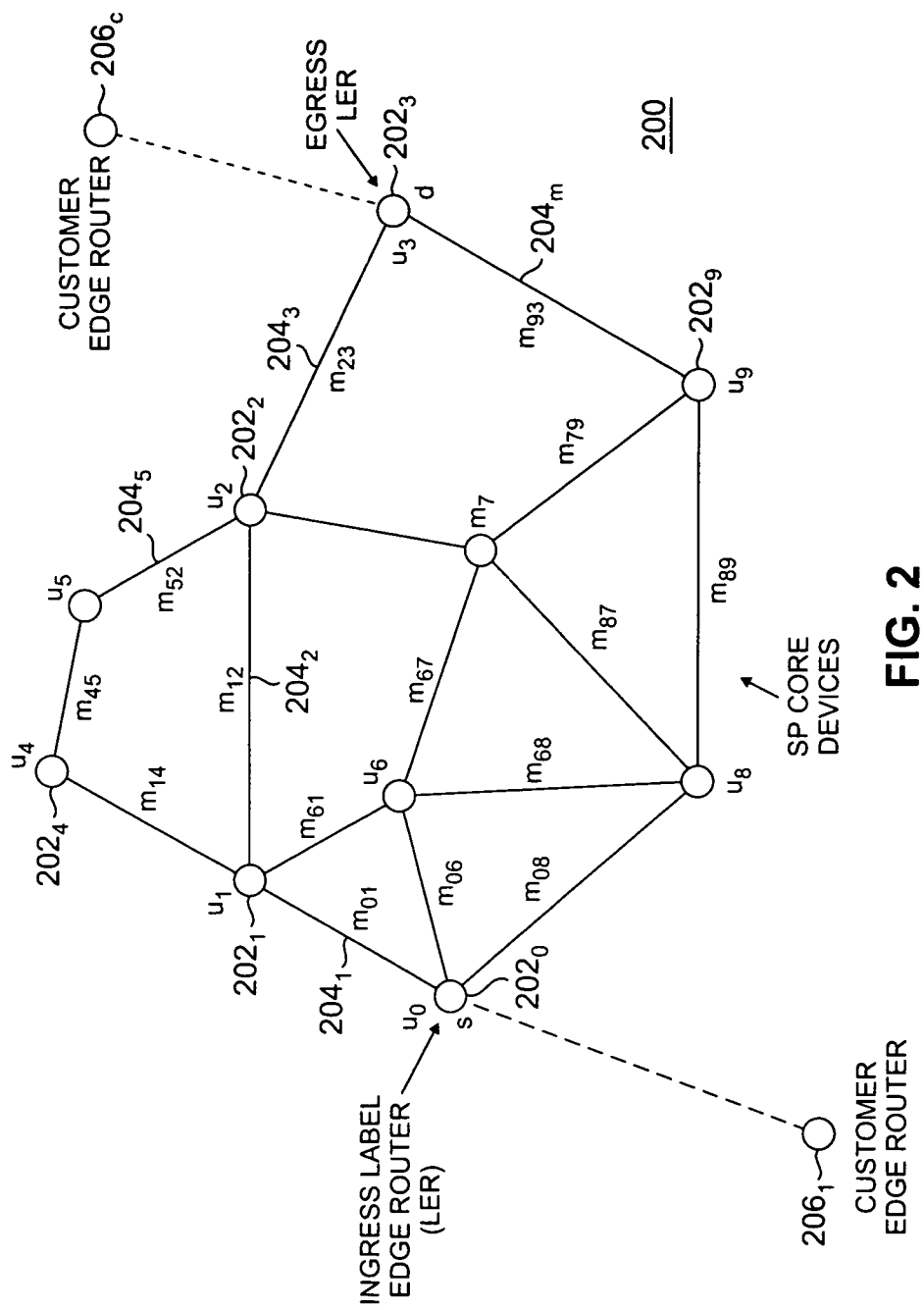
FIG. 2 depicts a schematic diagram of an exemplary label switched network.

A two-step algorithm 14. postprocessing(Gsub); // Post process to enumerate paths and bw reservation
15. return accept;

FIG. 2 depicts a schematic diagram of an exemplary label switched network 200. The present invention is illustratively depicted as being used in label switched networks, such as multi-protocol label switching (MPLS) networks, Asynchronous Transfer Mode (ATM) networks, Frame Relay (FR) networks, wavelength division multiplexing (WDM) networks, and new forms of service overlay networks.

The network 200 comprises a service provider 201 having plurality of nodes $202_n$, coupled by a plurality of links $204_m$, and a plurality of customer edge routers $206_c$. For purposes of clarity and conformance to industry practice, the nodes 202 are each labeled with the letter "u", while the links (i.e., edges) are labeled with the letter "m". For example, an ingress node $202_0$ is also illustratively labeled $u_0$, denoting the source node. Similarly, a link $204_1$, labeled $m_{01}$, denotes the signaling connection (e.g., physical wiring or fiber) between nodes $u_0$ and $u_1$ (i.e., nodes $202_0$ and $202_1$).

The present invention is discussed in terms of a centralized network, where one node (i.e., the source node) is designated as a network routing manager to whom all nodes periodically forward status information. The routing manager periodically recalculates the optimal paths between nodes and constructs and distributes new routing tables to all nodes. However, the present invention is also applicable to a distributed network, where each node calculates its own best routing table and transmits its status to the other nodes.

The label switched network 200 is modeled as a graph (G=(V;E)), where vertices ("V") and edges ("E") of the graph G respectively correspond to the network nodes 202 and the physical links 204 between the nodes 202. Each link 204 consists of two unidirectional (simplex) links (not shown) in opposite direction. A first simplex link provides a transmit path, while the other simplex link provides a receive path.

The plurality of nodes 202 are typically classified as label edge router (LER) nodes and service provider core devices serving as connectivity nodes, such as additional routers and switches. The LER nodes are ingress nodes (e.g., node $u_0$) and egress nodes (e.g., node $u_3$), where the network traffic enters and leaves the network 200. The LER nodes are the transit routers that forward packets based on the multi-protocol label switching (MPLS) labels. The service provider core devices illustratively include all the other routers and switches between the LER nodes, such as exemplary nodes $u_1$, $u_2$, and $u_4$ through $u_9$.

The customer edge (CE) routers 206 allow the customer to connect to the LER nodes of the service provider 201 to use the transport services of the LSP service provider network 200. The customer edge routers 206 are usually packet assembly and disassembly (PAD) devices that provide plain terminal connectivity, a bridge, or a router. It is noted that at step 104 of method 100, an exemplary ingress router node $u_0$ receives the path request from the CE router $206_1$.

In particular, each LER independently receives requests from connected CE routers 206 to setup bandwidth guaranteed paths. Each such request "r" is illustratively modeled with three elements r=(s; d; b), where s is the source node, d is the destination node, and b is the bandwidth requirement. The bandwidth requirement "b" is usually provided in terms of bitrate (e.g., 30 Mbits per second). It is noted that "b" is normally discussed in terms of bits per second for MPLS, ATM, and FR networks. For WDM networks, b is represented by a magnitude of wavelengths without any units. In other context, such as service overlay networks, b can be some other metric as long as all links in the graph consistently use the same type of metric.

In MPLS networks, a label switched path (LSP) between s and d is a simplex flow, that is, packets flow in one direction from s to d along a constrained routed path. For reverse traffic flow, additional simplex LSPs must be computed and routed from d to s. Accordingly, the request model and corresponding constrained path routing is asymmetric, since the path from s to d can be different from the path from d to s. Additionally, the amount of bandwidth reserved on each path may be different.

Referring to FIG. 1, at step 102, a customer edge router (e.g., CE router $206_1$) sends a request comprising an ingress router (e.g., source router $u_0$), an egress router (e.g., destination router $u_3$), and the bandwidth (b) required to deliver a particular message. Once at step 104 ingress router $u_0$ receives a path request to route information, at step 106, the ingress router assigns costs to links 204 in the network 200 to subsequently compute a primary path to the destination (i.e., egress router). It should be noted that a path represents end-to-end message routing, whereas a link 204 connects one node to an adjacent node or one node to a terminal.

FIG. 17 depicts a high-level block diagram of a network manager or controller 1702 suitable for use in the communications system 200 of FIG. 2. Specifically, the exemplary network manager or controller 1702 of FIG. 17 comprises a processor 1704, as well as memory 1710 for storing various network management and control programs, such as program 100. The processor 1704 cooperates with conventional support circuitry 1706 such as power supplies, clock circuits, cache memory and the like as well as circuits that assist in executing the software routines stored in the memory 1710. As such, it is contemplated that some of the process steps discussed herein as software processes may be implemented within hardware, for example, as circuitry that cooperates with the processor 1704 to perform various steps.

The network manager 1702 also contains input-output circuitry 1708 that forms an interface between the various functional elements communicating with the network manager 1702. For example, in the embodiment of FIG. 17, the network manager 1702 communicates with the multi-node communications network 200 of FIG. 2.

Although the network manager 7102 of FIG. 17 is depicted as a general-purpose computer that is programmed to perform various network management functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Figure 3:
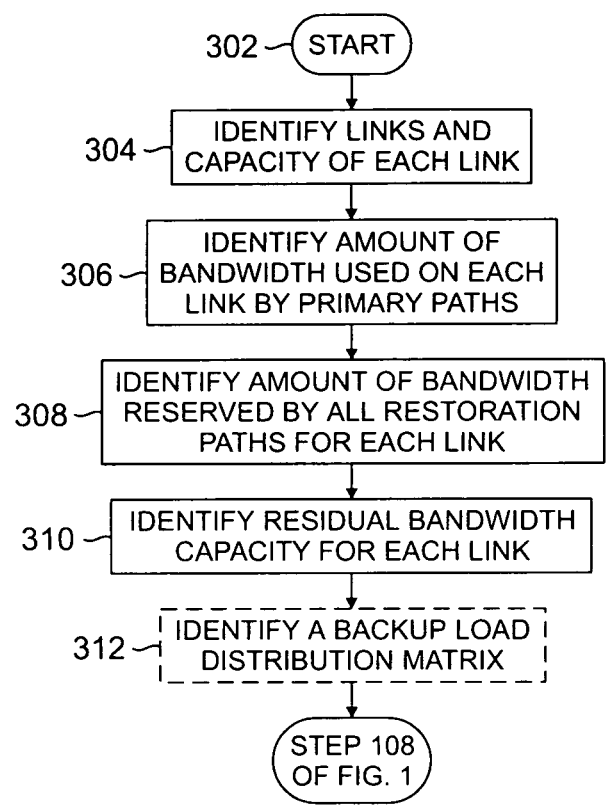
FIG. 3 depicts a flow chart of a method 300 of assigning costs to links 204 in the network of FIG. 2.

FIG. 3 depicts a flow chart of a method 300 of assigning costs to links 204 in the network of FIG. 2. The costs associated with establishing a primary path are directly related to a variety of factors, including, for example, congestion, number of intervening nodes, speed of the links, and the like. In one embodiment, routing algorithms that route a new path request are based only on the knowledge of the current state of the network, and do not exploit properties of future requests.

The method 300 starts at step 302, where in response to the tunnel request r=(s; d; b), the source node uses its knowledge of network state such as topology for all the links, to compute a primary path. Each link has state variables associated with it, and may be assigned one or more link costs. In particular, every link 204 in a network (e.g., G=(V;E)) has a particular bandwidth capacity (CI), and three state variables regarding capacity usage, as discussed in further detail below.

At step 304, the source node identifies the network links and the capacity of each link. At step 306, the source node identifies the amount of bandwidth used on a link by all primary paths ($F_l$). Each primary path will need to reserve additional bandwidth on the link. For example, two primary paths with b1 and b2 bandwidth requirements may share a link l, where the bandwidth reservation on l will be b1+b2.

At step 308, the source node identifies the amount of bandwidth reserved by all restoration (i.e., backup) paths ($A_l$) that contain for any given link, and at step 310, the source node identifies the residual capacity ($R_l$), if any, on the link, which is defined as $R_l=C_l-(F_l+A_l)$. The three state variables (i.e., $R_l$, $F_l$, and $A_l$) are maintained and exchanged among peering routers.

Optionally, at step 312 (drawn in phantom), the source node identifies a backup load distribution matrix. That is, the three per-link state variables may be used to form a new state called Backup Load Distribution (BLD) matrix. The BLDM is computed using information exchanged among nodes or sent to the central route manager in the centralized case.

Specifically, given a network with m links, each network node (router or switch) maintains an m×m BLD matrix. For example, if the primary load $F_j$ on a link j is b units, entries BLDM[i, j], 1<=i<=m, where j does not =i, record what fraction of b is backed up on link 1. Note that the BLD approach allows maximum bandwidth sharing. If a link is used in the primary path P of request r=(s; d; b), then b units of bandwidth has to be consumed on each link in P. Therefore, where the residual capacity ($R_l$) is greater or equal to b, then the cost of using a link 204 in the primary path is b units (e.g., Mb). Where the residual capacity ($R_l$) is less than b, then the link cannot be used in the primary path.

Accordingly, the source node uses its knowledge of network state such as topology, $C_l;R_l;A_l; F_l$ for all the links in a particular set of edges (E), and optionally the BLD matrix, to compute a primary path, as well as a sub graph Gsub=(Vsub; Esub) such that the restoration (backup) path exists in Gsub (discussed below with regard to steps 112 and 114 of FIG. 1), which can route traffic from s to d if any link 204 in the primary path fails, as described below in further detail. The method 300 then proceeds to step 108 of FIG. 1.

Referring to FIG. 1, once the associated costs are determined and assigned to the links at step 106, at step 108, the source node computes the primary path having guaranteed bandwidth between the source and destination nodes. In particular, the source node uses the links having the least amount of costs associated in forming the primary path. That is, the source node will generate a primary path that utilizes the least amount of bandwidth within the time limits necessary to satisfy the request.

The service provider edge router utilizes a shortest path algorithm. In one embodiment, the service provider label edge router (LER) utilizes the Dijkstra shortest path algorithm. Although the Dijkstra algorithm yields an optimal solution for a single request, over a span or multiple requests, the Dijkstra algorithm may lead to high request rejection and low network utilization.

In a second embodiment, the LER utilizes the open shortest path first (OSPF) algorithm, which calculates the primary path based on the number of routers, transmission speed, delays, as well as the route costs. In a third embodiment, the LER preferably utilizes the widest shortest path first (WSPF) algorithm, which selects the shortest path having maximum (i.e., widest) residual capacity ($R_l$) on the links. Other embodiments may utilize minimum interference routing, profile based routing (PBR), among others.

For example, referring to FIG. 2, assume a request by a user requires a particular data rate (e.g., 30 Mb/sec) between the source and destination nodes. A first illustrative path $P_1$ between the source and destination nodes may comprise nodes $u_0$, $u_1$, $u_2$, and $U_3$ (i.e., links $m_{01}$, $m_{12}$, and $m_{23}$), while a second illustrative path $P_2$ may comprise nodes $u_0$, $u_8$, $u_9$, and $u_3$ (i.e., links $m_{08}$, $m_{289}$ and $m_{93}$). For example, using the WSPF algorithm, the path utilizing the least amount of bandwidth will be selected as the primary path over the other possible paths.

Figure 4:
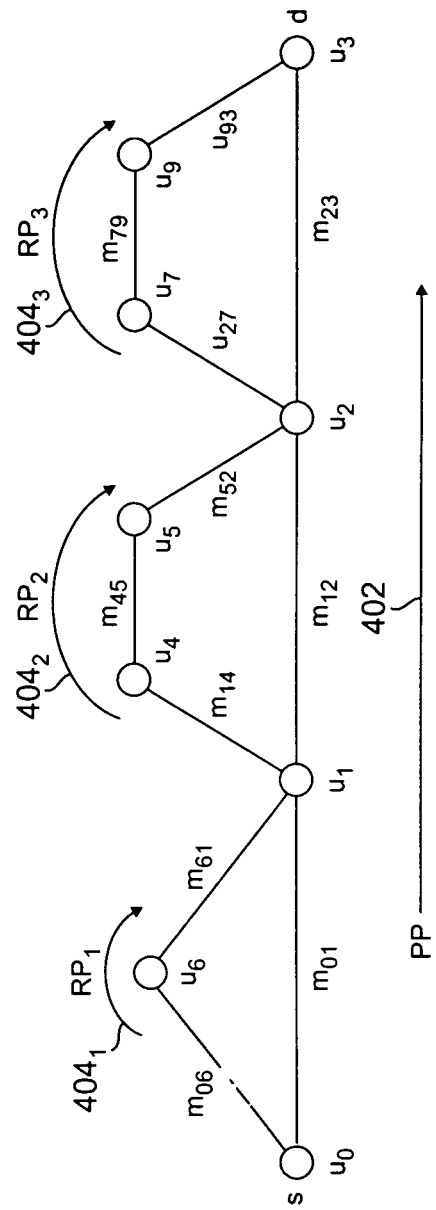
FIG. 4 depicts a portion of the network of FIG. 2 illustrating an exemplary primary path and at least one restoration path.

FIG. 4 depicts a portion of the network 200 of FIG. 2 illustrating an exemplary primary path 402 and at least one restoration path 404. The primary path 402 computed and selected at step 108 comprises the link $m_{01}$ between the source node $u_0$ and node $u_1$, link $m_{12}$ between the node $u_1$ and node $u_2$, and link $m_{23}$ between the node $u_2$ and the destination node $u_3$. It is noted that in the event a primary path cannot be computed, then the request will be rejected. Additionally, FIG. 4 depicts three restorations paths (RP) 404 comprising $RP_1 404_1$, $RP_2 404_2$, and $RP_3 404_3$, which are discussed below in further detail with regard to computing the restoration paths at step 114 of FIG. 1.

Referring to FIG. 2, it is noted that other primary paths may have been selected, such as a primary path using nodes $u_0$, $u_8$, $u_9$, and $u_3$. However, the costs associated with using the exemplary links $m_{08}$, $m_{89}$, and $m_{93}$ would have been found to be greater (in step 106 of FIG. 1) than the costs of using the primary path 402 having links $m_{01}$, $m_{12}$, and $m_{23}$.

Once the primary path 402 between the source and destination nodes (e.g., nodes $u_0$ and $u_3$) are computed in step 108 of method 100, at step 110, the method 100 determines the permissible backtracking distance "D" for restoration, within the bandwidth and restoration latency tolerances of the customer making the request.

The backtracking distance D is defined as the maximum number of hops (links) in the primary path that must be traversed upstream towards the source node, before reaching the node at which the required backup (restoration) path originates. In the case of end-to-end restoration routing, detection of link failures and subsequent restoration by the source node $U_0$ can lead to long restoration latencies. Local restoration attempts to address this problem by "localizing" fault detection and subsequent restoration actions.

Figure 5:
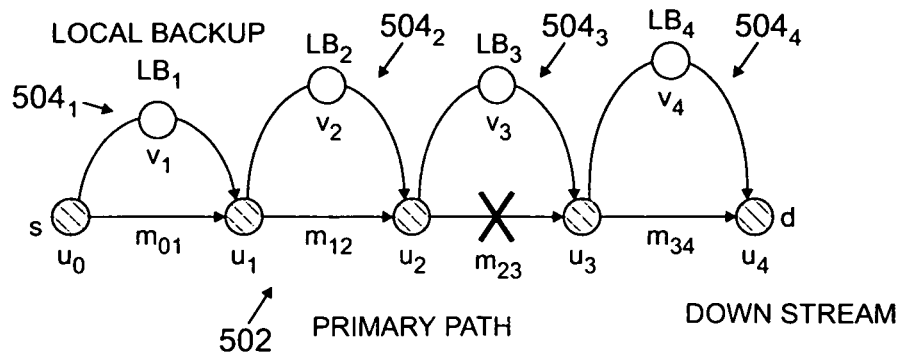
FIG. 5 depicts a schematic diagram illustrating naïve local restoration.

FIG. 5 depicts a schematic diagram illustrating naïve local restoration. FIG. 5 illustratively shows that for a particular primary path 502, there are as many backup paths LBi 505 as there are links 202 in the primary path 502. In particular, the exemplary primary path 502 comprises three nodes $u_0$ through $U_4$ respectively coupled by links $m_{01}$, $m_12$, $m_{23}$, and $m_{34}$, where nodes $u_0$ and $u_4$ are the source and destination nodes.

Four local backup (LB) paths 504 are also shown in FIG. 5. In particular, $LB_1 504_1$ is formed by at least one other node in the network (i.e., vertex node $v_1$) between nodes $u_0$ and $u_1$. Similarly, $LB_2 504_2$ is formed by at least one other node in the network (i.e., vertex node $v_2$) between nodes $u_1$ and $u_2$, and so forth. As such, the four local backup (i.e., restoration) paths provide an alternative routing path in the event of a failure at one of the links in the primary path 502. For example, if the third link $m_{23}$ fails (shown in FIG. 5 having an X therethrough), then node $u_2$ provides the routing from $u_2$ to $v_3$ to $u_3$ (i.e., $LB_3$).

Although, restoration during a single link failure is rapid in the naïve local restoration shown in FIG. 5, the backup paths 504 are completely disjoint from the primary path 502, which results in bandwidth wastage. The present invention includes backtracking capabilities, where the backup paths 504 share links amongst them, while also sharing links in the primary path 502. Employing backtracking during restoration allows for minimal bandwidth usage in exchange of increased restoration latency.

Figure 6:
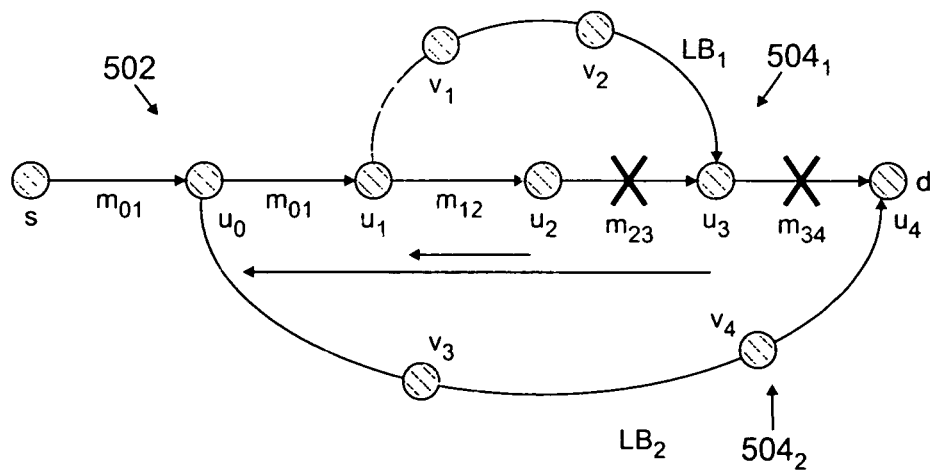
FIG. 6 depicts a schematic diagram illustrating local restoration with backtracking.

FIG. 6 depicts a schematic diagram illustrating local restoration with backtracking. In this case, links $m_{12}$ and $m_{23}$ are protected by a single backup path, $LB_1=(u_1; v_1; v_2; u_3$, where "u" and "v" respectively denote primary and restoration nodes). The backup path for link $m_{23}$ (u2; u3) is link $m_{12}$ (u2; u1) and LB1, which backtracks over primary path by distance of one link, namely link $m_{12}$ (u2; u1).

Similarly for link $m_{34}$ ($u_3$; d), the backup path (u3; u2), (u2; u1), (u1; u0), LB2, backtracks by a distance of three links (D=3). That is, the backtracking links include links $m_{23}$, $m_{12}$, and $m_{01}$. If restoration must be truly local, i.e., failure of link $m_{23}$ (u2; u3) must be restored by u2 and failure of link $m_{34}$, (u3; d) must be restored by $u_3$, then $u_2$ and $u_3$ must "switch back or backtrack" traffic on links between nodes (u3; u2), (u2; u1), (u1; u0). Such repeated link traversals cause undesirable traffic loops, loss and bandwidth wastage. This is especially true when the node performing the restoration is multiple hops away from the node to which failed link belongs.

Alternatively, if nodes u2 and U3 can inform $u_1$ out-of-band of their links failures, $u_1$ can perform the restoration. However, in this case, restoration is non-local and requires a new form of signaling or modifications to existing routing protocol state updates.

Referring to FIG. 1, at step 110, a determination is made regarding the backtracking distance to be used to compute the restoration paths. The present invention includes three backtracking distance embodiments. A first embodiment includes no backtracking (D=0). In this case, the backup path must originate at the node at which the failed link originates, which represents true local restoration and provides best restoration latency. The link restoration paths computed for D=0 can use a subset of primary path links downstream towards the destination node.

A second embodiment includes bounded backtracking (D=k), where k equals some integer greater than zero (0). In this embodiment, the backup path can originate at a node on the primary path up to "k" hops away from the node that owns the link.

A third embodiment includes infinite backtracking (D=∞). In this instance, unlimited backtracking is permissible, and therefore in the worst case, the backtracking may result in backup paths that originate at the source node. The end-to-end restoration may be considered a special case of this where the maximum backtracking allowed is equal to length of the primary path, however the restoration always has to be initiated at the source node.

The first backtracking embodiment (i.e., D=0) may require the highest amount backup bandwidth and lowest restoration latency, whereas the third backtracking embodiment (i.e., D=∞) requires the least amount of bandwidth and highest restoration latency. The second backtracking embodiment (i.e., D=k, where k is an integer greater than 0) provides a tradeoff of bandwidth utilization for better restoration latency.

It is noted that the sharing of links on backup paths exploits the fault model and the restoration mechanisms as described above, and is central to efficient routing of backup paths. Bandwidth sharing may be categorized as either inter-request sharing or intra-request sharing. In the case of inter-request sharing, the single fault model dictates that two link-disjoint primary LSPs corresponding to two requests, each of b units, do not fail simultaneously. This allows them to share a single backup path of b units. In other words, inter-request bandwidth sharing allows one of the two primary paths to use the backup links "for free".

In the case of intra-request sharing, during local restoration, each link on the primary path requires a backup path, and only one link failure can happen at any given time. As such, the backup paths for different links in the same primary path can share links. Additionally, backup paths can share primary path links. It is noted that intra-request bandwidth sharing does not exist in the end-to-end path restoration schemes.

The present invention provides online distributed local restoration routing algorithms that utilize both inter-request sharing and intra-request sharing in order to minimize the total bandwidth reserved. That is, bandwidth sharing is required when computing the primary path P and its corresponding backup restoration graph Gsub for various cases of backtracking.

Figure 7:
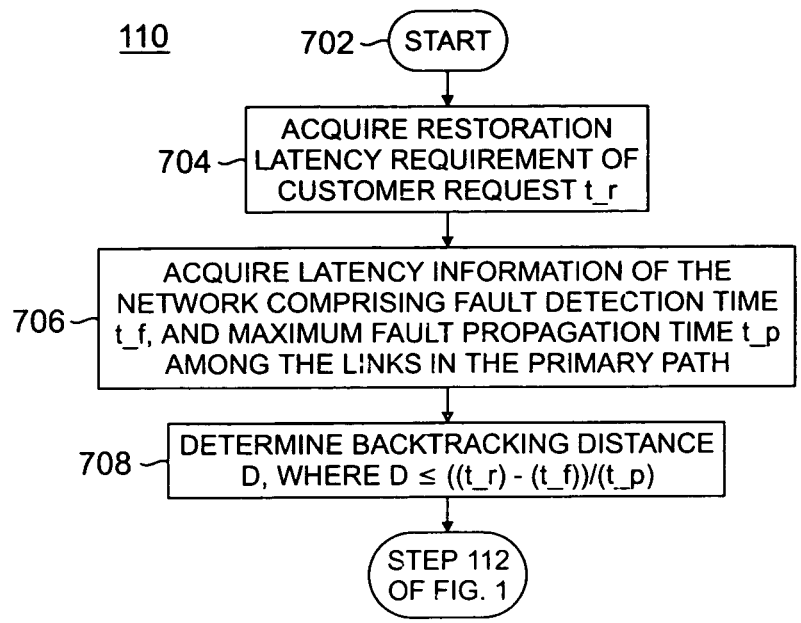
FIG. 7 depicts a method of determining backtracking distance.

FIG. 7 depicts a method 110 of determining backtracking distance. The method 110 begins at step 702, and proceeds to step 704, where the source node acquires the restoration latency requirement (t_r) of the customer request (r=s,d,b). As discussed above, the restoration latency requirement (t_r) is customer specific.

At step 706, the source node acquires the latency information of the network 200. The latency information of the network 200 comprises the fault detection time (t_f) among the links in the primary path, as well as the maximum fault propagation time (t_p) among the links in the primary path. The method 110 then proceeds to step 708.

At step 708, the source node determines the backtracking distance D for the subject request of by the customer. The backtracking distance D is less than or equal to the difference between customer latency requirement less the fault detection time, divided by the max fault propagation time (D<=((t_r)−(t_f)/(t_fp)). If ((t_r)−(t_f)/(t_fp) is fractional, the value is rounded up to the next integer and assigned to D.

For example, if the customer restoration latency requirement (t_r)=100 ms, the fault detection time (t_f)=10 ms, and the max fault propagation time (t_p)=40 ms, then ((t_r)−(t_f)/(t_fp))=(100−10)/40=D=3. Once the source node determines the backtracking distance D for the particular request, the method 700 proceeds to step 112 of FIG. 1. At step 112, the source node assigns costs to the links in the network to compute the restoration paths.

From the perspective of backup routing, every link has two kinds of bandwidth available: (1) Free bandwidth (FR), which is completely sharable and does not require extra resource reservation, and (2) Residual bandwidth (R), which is the actual capacity left unused on the link. If the LSP request size b>$FR_l$, then b−$FR_l$ units of bandwidth must be allocated on the link to account for the worst-case backup load on the link. If the residual bandwidth $R_l$ falls short of b−$FR_l$ (i.e., b−$FR_l$>$R_l$), then the link l cannot be used on the backup path and is called an "infeasible link". As such, the costs of using link l on a backup path to backup primary link i on the primary path P consists of two parts. The first part includes the cost of using the free bandwidth on the link, while the second part includes the cost of using the residual bandwidth on the link. Equation 1 illustrates the form of cost w[l, i] incurred to backup primary link i on 1.

Equation 1:

Vector W of Costs for backup link $l$ $$W[l, i] = \begin{cases} \infty & \text{if } b - FR[l, i] > R_l; \\ b * C_F & \text{if } b = \; < FR[l, i]; \\ FR[l, i] * C_F + & \text{if } b > FR[l, i]; \\ (b - FR[l, i]) * C_R & \text{and } (b - FR[l, i]) < R_l. \end{cases}$$

FR[l, i] is the free bandwidth on l available to link i, i.e, it is equal to the total bandwidth reserved by all backup paths on link l before the current request r minus backup load induced by l on i before the current request r. The cost metrics $C_F$ ($C_R$) should be selected in such a way that selecting a link with high residual capacity $R_l$, results in smaller cost. The cost metrics $C_F$ ($C_R$) should be selected in such a way that selecting a link with high residual capacity R[l], results in smaller cost. In other words, if $R_{l1}$, $<R_{l2}$, then $C_R[l_1]>C_R[l_2]$. One such function is $C_R[l]=a(1-R_l/R_{max})^p$ where $R_{max}=\max_l R_l$. Similarly, if $F_{max}=\max_l F[l]$, then $C_{FS}[l]=c(1-F[l]/F_{max})^q$, satisfies the constraint that if $FR[l_1]<FR[l_2]$, then $C_F[l_1]>C_F[l_2]$.

Given m links in the primary path, each candidate link l has m associated costs $w_{l,1}, w_{l,2}, \ldots W_{l,m}$ where m is the number of links on the primary path. Given that a link l may be used in backup paths for multiple links i in the primary path, in order to make the problem tractable, a pessimistic approach is used, and the free available bandwidth for l is reduced as shown in Equation 2.

Equation 2:

Free available bandwidth for link $l$ $$FR_l = \min_{i \in E(P)} FR[l; i] = A_l - \max_{i \in E(P)} BLDM[l; i], \text{ where}$$

E(P) denotes the edge set used in path P and V(P) denote the node set used in path P. Correspondingly, the cost $w_l$ of using link l on the backup path for any link in P can be computed as follows using Equation 3.

Equation 3:

Simplified scalar costs for link $l$ $$W_l = \begin{cases} \infty & \text{if } b - FR_l > R_l; \\ b * C_F & \text{if } b = \; < FR_l; \\ FR_l * C_F + & \text{if } b > FR_l; \\ (b - FR_l) * C_R & \text{and } (b - FR[l, i]) < R_l. \end{cases}$$

It is noted that simplified scalar cost for link l is preferred over the vector W of costs for link l, since it is difficult to develop algorithms using the vector W. Once at step 112, the costs have been assigned to the links in the restoration paths, the method 100 proceeds to step 114, where the restoration paths are computed.

Recall, that a restoration (backup) subgraph Gsub must be determined such that there is an alternative path with backtracking within D if any link in the primary path fails, and the total link costs for all backup paths are minimized. Where the backtracking distance D=0, the problem is considered NP-hard for computing an optimal restoration (backup) sub graph Gsub. The algorithm for the computation of Gsub comprises: (1) Compute a directed Steiner tree Gstei on subgraph G0=(V, E-E(P)), rooted at d and with the nodes V(P)–{d} in the primary path as its terminal nodes; and (2) Reverse all the edges of the tree to obtain backup subgraph Gsub.

Figure 8:
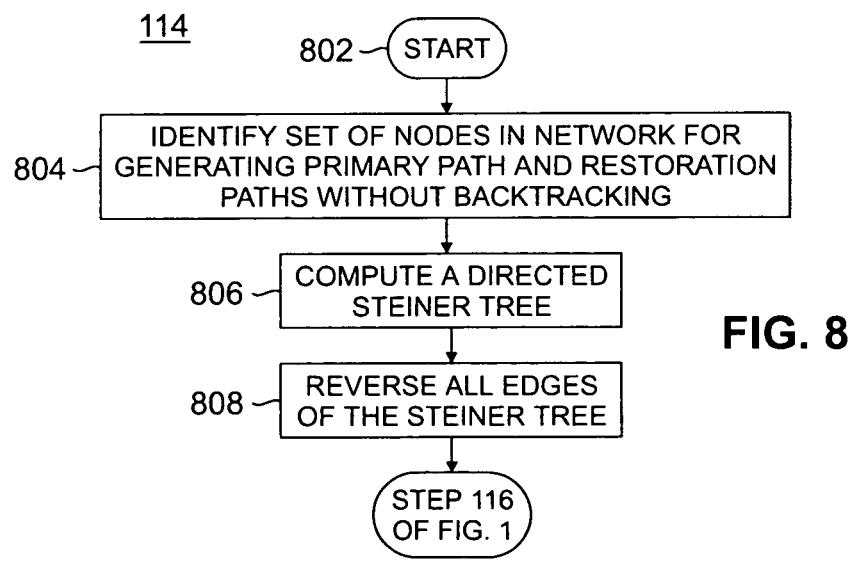
FIG. 8 depicts a first method of heuristically computing a backup path.

FIG. 8 depicts a first method 800 of heuristically computing a backup path. Specifically, FIG. 8 depicts a first method of heuristically computing a backup path for D=0. Recall, the backtracking distance "D" is variable and dependent on the tolerances of the customer sending the request (r=s,d,b). Given a primary path P for request (s; d; b) in directed graph G=(V;E), if there is a complete constraint on the backtracking distance (D=0), a modified Steiner tree algorithm for disjoint paths computes a minimum cost backup set of edges for the primary path P. Where D=0, the customer typically requires rapid restoration for a link failure and is intolerant to restoration latency.

Figure 9A:
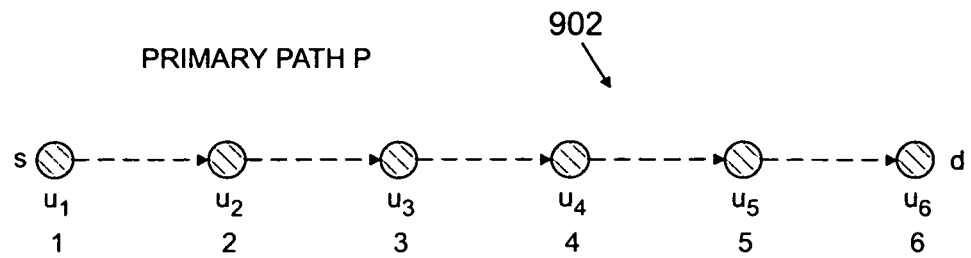
FIGS. 9A-9C depict schematic diagrams illustrating local restoration with constrained backtracking according to the method of FIG. 8.
Figure 9C:
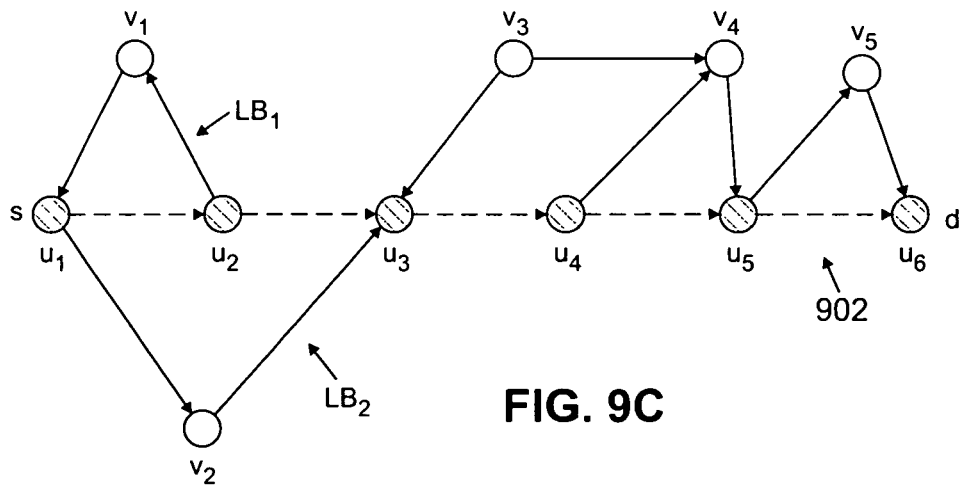
Figure 9B:
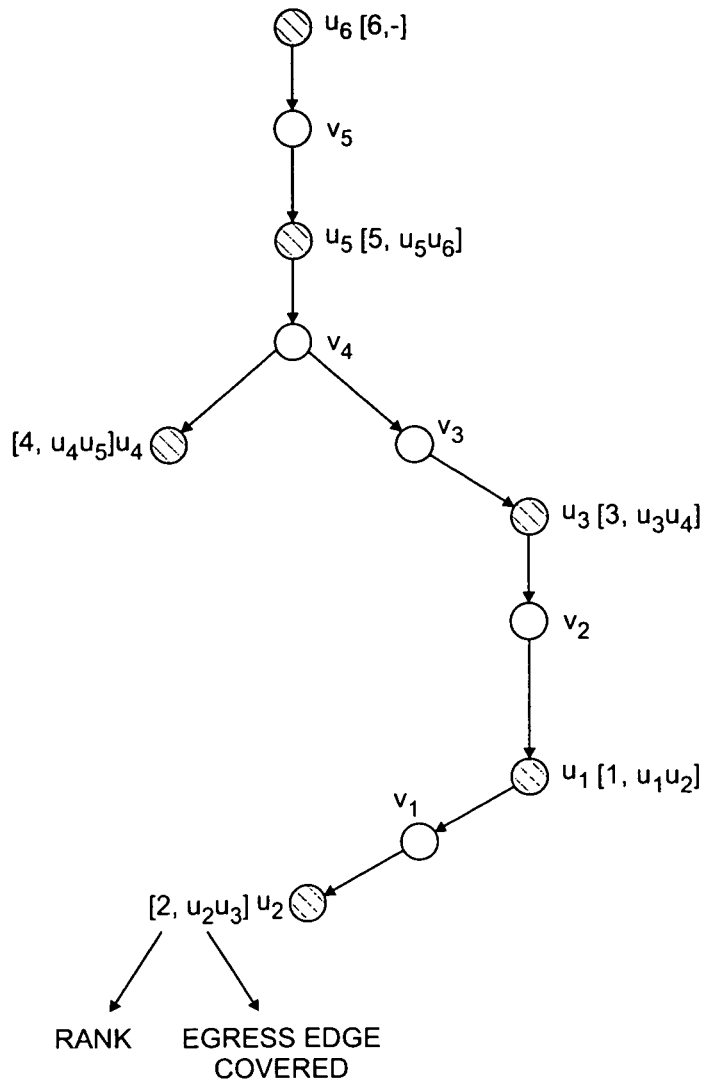

FIGS. 9A-9C depict schematic diagrams illustrating local restoration with constrained backtracking according to the method of FIG. 8. FIGS. 9A-9C should be viewed together with FIG. 8. The method 800 begins at step 802, and proceeds to step 804, where the method 800 identifies the set of graph nodes "G" for providing the primary and restoration paths. Graph G includes those nodes identified in step 106 of method 100 in FIG. 1. FIG. 9A depicts an exemplary primary path 902 having nodes $u_1$ through $u_6$, where nodes $u_1$ and $u_6$ respectively represent the source and destination nodes. That is, FIG. 9A shows the primary path P=(s=u1, u2, u3, u4, u5, d=u6).

At step 806, a directed Steiner Tree is computed. The Steiner tree provides a technique to compute a path from a root node to every terminal (node) in a set of terminals in a particular graph (network), such that the total cost of the paths are minimized. In particular, a directed Steiner tree is a directed tree rooted from a particular node containing the terminals, with all edges directed "away" from the root node. FIG. 9B shows the corresponding Steiner tree Gsteiner of FIG. 9A. Referring to FIG. 9B, an exemplary directed Steiner Tree is depicted for the nodes included in the primary path 902 and a plurality of restoration nodes denoted as $v_1$ through $v_5$ for the primary path 902. It is noted that the restoration nodes $v_1$ through $v_5$ are illustratively interspersed between nodes of the primary path 902, and in this instance, the Steiner tree is rooted at the destination node $u_6$. Further, the edges (i.e., links) are directed away from the root node $u_6$ at the destination (note the arrows forming the edges point away from the root node $u_6$).

Various approximation algorithms may be used to compute a directed Steiner trees, such as the Selective Closest Terminal First (SCTF) algorithm (by Charikar et al.), and the like. In one embodiment, the SCTF algorithm is used since the SCTF algorithm has a good approximation ratio, where the graph is not very asymmetric. It is noted that asymmetry is measured as the sum of the larger cost of edges (u; v) and (v; u) divided by the sum of the smaller cost.

The backup subgraph is computed by initializing the current subgraph Gsub to be the single node d; the algorithm then iteratively computes a shortest path from the current set of nodes in the primary path that are not in the current sub graph to the current sub graph; and the algorithm terminates when all the primary nodes are in Gsub. Each of the iterations involves computing a shortest path from one set of nodes to another set of nodes. This only requires one invocation of Dijkstra's algorithm by adding dummy source and destination nodes.

FIG. 9C shows the backup sub graph Gsub, which has links that are reverse of those in Gsteiner of exemplary FIG. 9B. At step 808, the edges of the directed Steiner tree are reversed. For example, the edges from node $u_1$ are reversed and point to node $v_1$, while the edge from node $v_2$ is reversed to point to node $u_1$. Accordingly, the directed Steiner tree finds the shortest path from the root node to the terminal nodes. Reversing the Steiner tree finds the shortest path from the terminal nodes to the root (i.e., destination node).

The reversed directed Steiner tree used as a restoration sub graph Gsub has several advantages. One advantage is for every link in the primary path, there are multiple restoration paths that end on the immediate neighbor or neighbors downstream. This encourages sharing of primary path links and minimizes new bandwidth reservation. In the example of FIG. 9, in the case of links (u3; u4) and (u4; u5), the backup paths (u3; v3; v4; u5), and (u4; v4; u5) share the primary path link (u5; u6) for restoration. A second advantage is the explicit tree structure ensures that local restoration paths share links. In the example of FIG. 9C, restoration path for (u1; u2) is LB1=(u1; v2; u3), which is also part of the restoration path (u2; v1; LB2) for (u2; u3). Once the restoration paths are computed, the method 114 proceeds to step 116, where post processing optimally selects the restoration paths from the Gsub.

Figure 10:
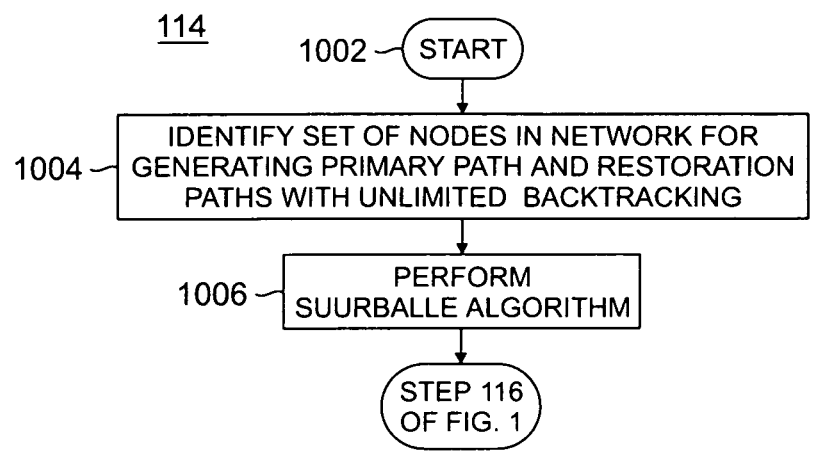
FIG. 10 depicts a second method of heuristically computing a backup path.

FIG. 10 depicts a second method of heuristically computing a backup path. Given a primary path P for request (s; d; b) in directed graph G=(V;E), if there is no constraint on the backtracking distance (D=∞), the Suurballe algorithm for disjoint paths computes a minimum cost backup set of edges for the primary path P. The method 114 starts at step 1002, and proceeds to step 1004, where the set of nodes in the network (i.e., graph nodes G) are identified for generating the primary path and the restoration paths with unlimited backtracking capabilities. At step 1006, the Suurballe algorithm is performed. The Suurballe algorithm reverses the direction of the edges on the primary path P and sets their cost to zero. All other edges are assigned cost as discussed above at step 112 of method 100.

Figure 11:
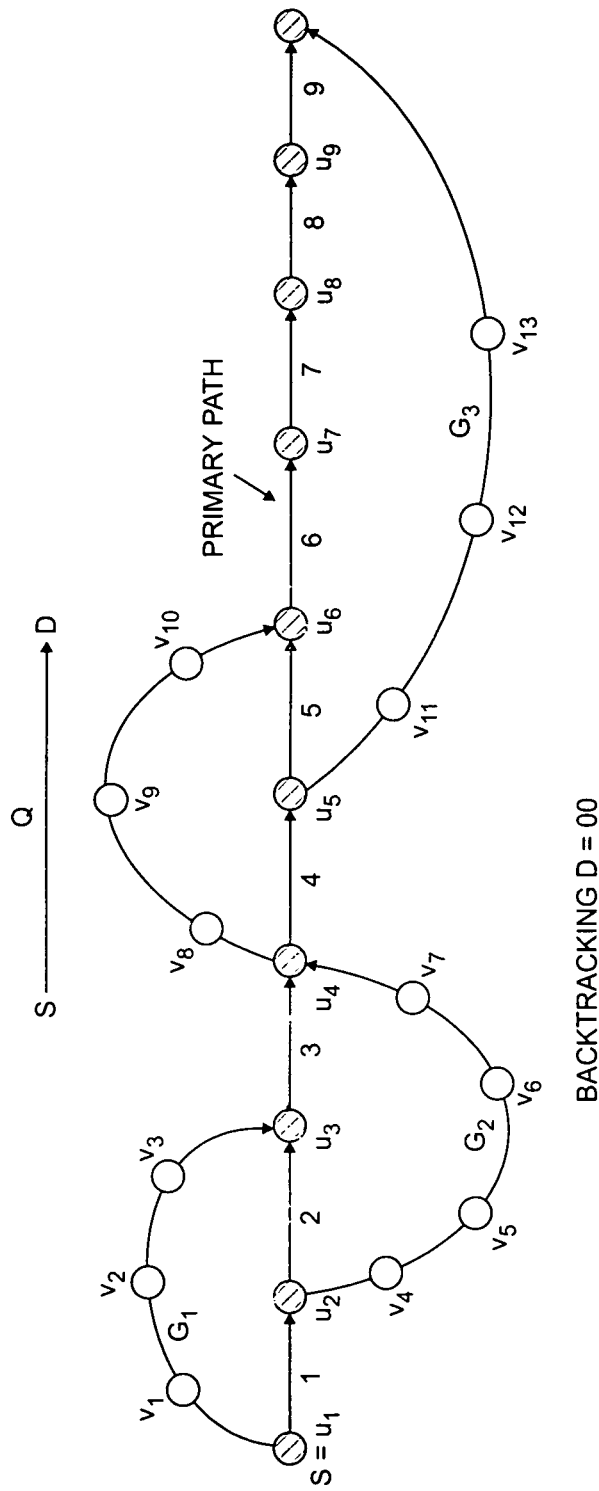
FIG. 11 depicts a schematic diagram illustrating local restoration with unlimited backtracking according to the method of FIG. 10.

FIG. 11 depicts a schematic diagram illustrating local restoration with unlimited backtracking according to the method of FIG. 10. FIG. 11 illustrates an exemplary primary path P comprising (u1, u2, . . . , u10) nodes, where the backup sub graph consists of paths (u1; v1; v2 v3; u3), (u2; v4; v5; v6, v7; u4; v8; v9; v10; u6), and (u5; v11; v12; v13; u10) are computed for the shortest path Q from s to d in the resulting graph G". The Suurballe algorithm shows that the edges of backup path Q that are not in the primary path P, represent the optimal backup path for the primary path P with D=∞. Referring to FIG. 11, Q=u1, v1, v2, v3, u3, u2, v4, v5, v6, v7, u4, v8, v9, v10, u6, u5, v1, v12, v13, and d. Once the shortest path Q has been computed, then the method 114 proceeds to step 116 of FIG. 1, where post processing optimally selects the restoration paths from the Gsub.

Figure 12:
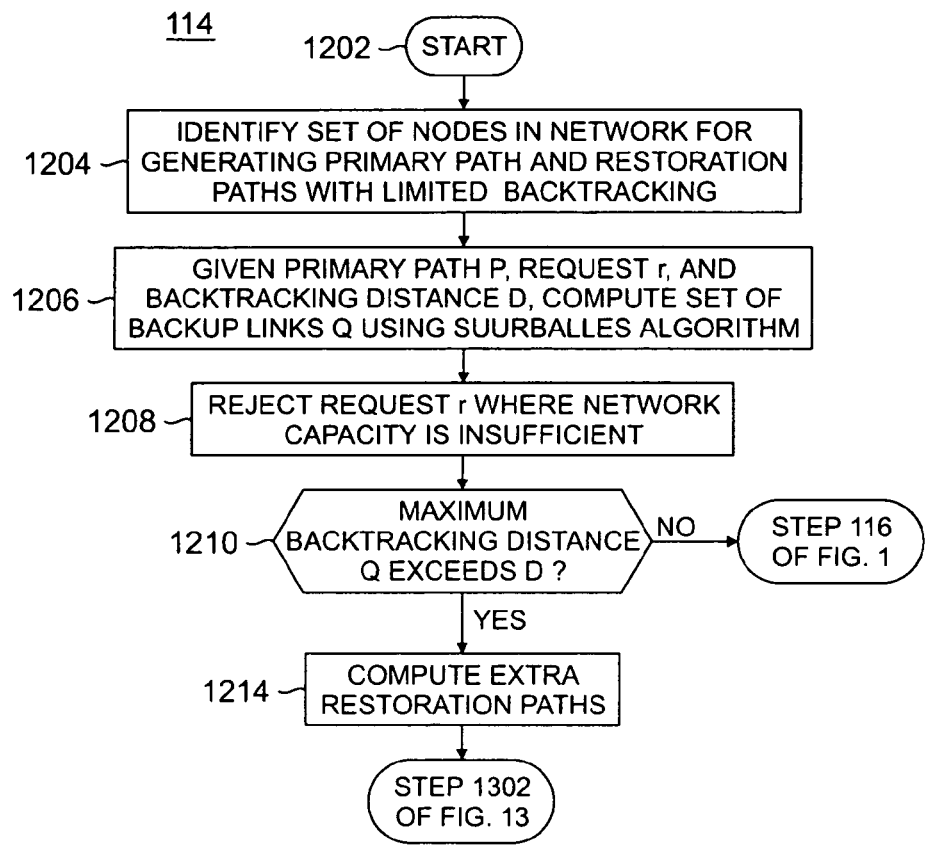
FIG. 12 depicts a third method of heuristically computing a backup path.

FIG. 12 depicts a second method of heuristically computing a backup path. Given a primary path P for request (s; d; b) in directed graph G=(V;E), if there is limited constraint on the backtracking distance (D=k, where k is an integer greater than 0, but not unlimited), then a modified Suurballe algorithm for disjoint paths computes a minimum cost backup set of edges for the primary path P. The algorithm for Backup Path Computation where D=k is a modified Suurballe algorithm of the case where D=∞, and is illustratively shown below in Table 2.

TABLE 2

| Modified_Suurballe(G,P,r,k) |
|---|
| 1: Q = Suurballe(G, P); |
| 2: If(Q==NULL) return NULL; |
| 3: |
| 4: if (maxD(P,Q) >k) |

TABLE 2-continued

| Modified_Suurballe(G,P,r,k) |
|---|
| 5: Ga = compExtraPaths(G,P,Q,k); |
| 6: if(Ga==NULL) return NULL; |
| 7: else Gsub = Q [Ga; |
| 8: return Gsub; |

FIG. 12 illustrates the steps of the modified Suurballe algorithm used in step 114 of method 100. The method 114 starts at step 1202, and proceeds to step 1204, where the set of nodes in the network (i.e., graph nodes G) are identified for generating the primary path and the restoration paths with limited backtracking capabilities (i.e., D=k). Once the source node has computed the primary path p for the request r and determined the backtracking distance D, at step 1206, the source node computes a set of links Q using the Suurballe algorithm, as discussed above with regard to FIGS. 10 and 11. At step 1208, if there is insufficient network capacity, then the request is rejected.

However, assuming there is sufficient network capacity, then at step 1210, a query is made whether the maximum backtracking distance Q computed in step 126 exceeds the predetermined backtracking distance D. The edges of Q allow the primary path edges to be restored, however the maximum distance some edges in the primary path has to backtrack might not be bounded by k. This problem is illustrated in FIG. 14.

Figure 13:
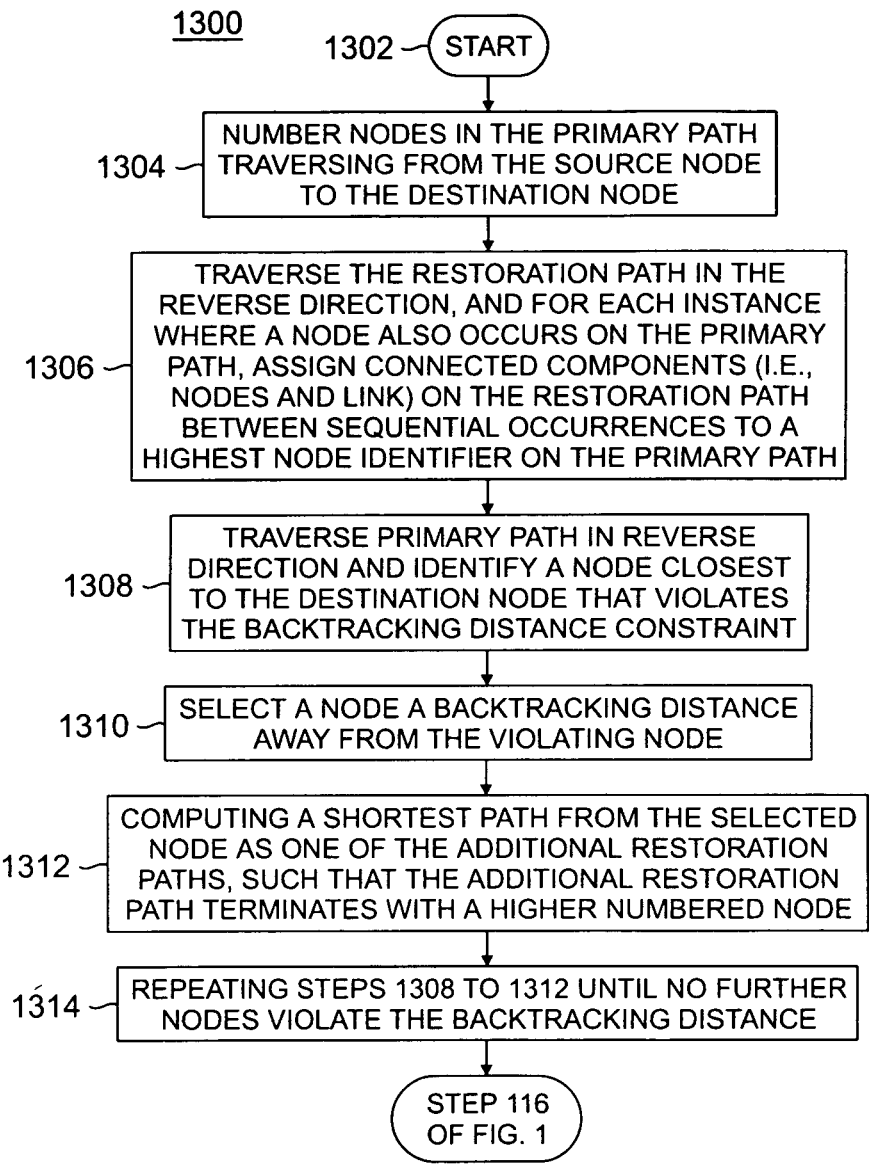
FIG. 13 depicts a method of heuristically computing additional backup paths of the method of FIG. 12.
Figure 14:
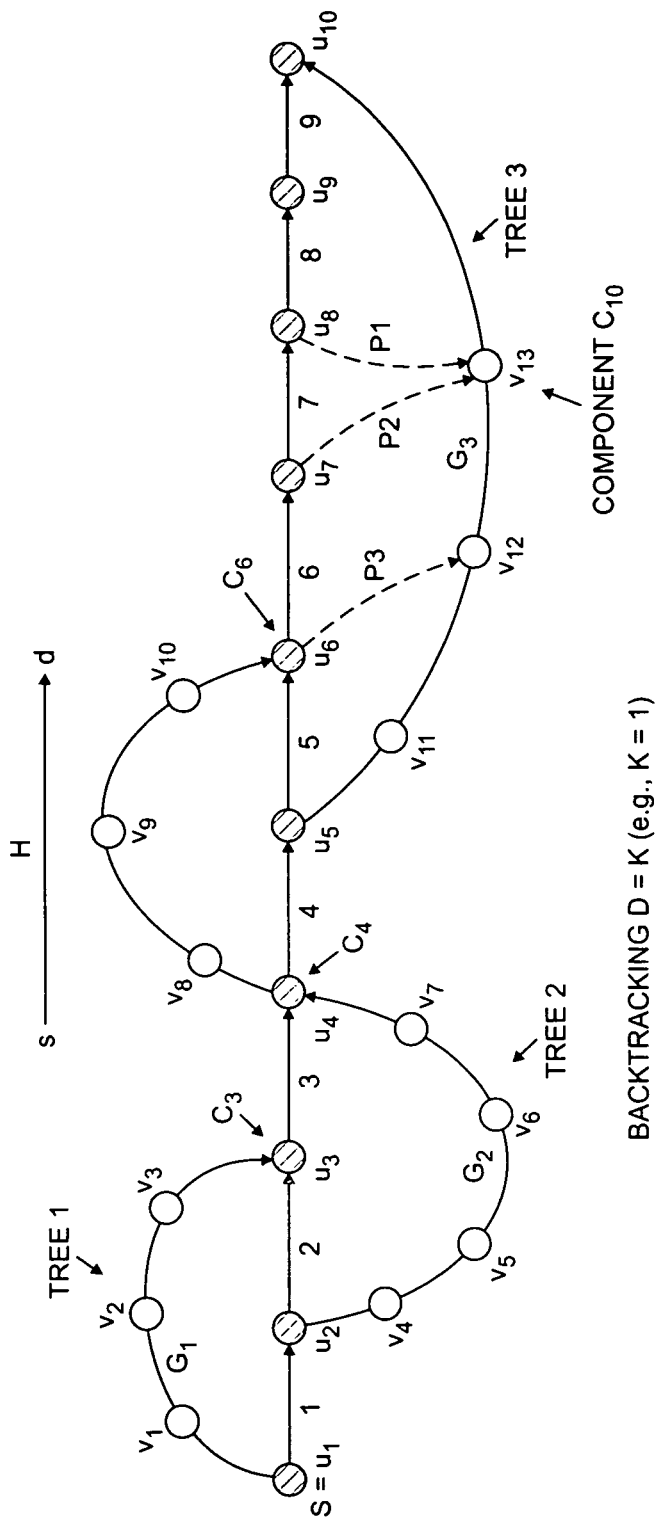
FIG. 14 depicts a schematic diagram illustrating local restoration with limited backtracking according to the methods of FIGS. 12 and 13.

FIG. 14 depicts a schematic diagram illustrating local restoration with limited backtracking according to the methods of FIGS. 12 and 13. FIG. 14 is the same as graph as shown in FIG. 11, except that three additional exemplary paths P1, P2, and P3 are respectively formed between nodes (u8, v13), (u6, v12), and (u7, v13) as discussed in further detail below. For purposes of understanding the invention, the backtracking distance k is illustratively equal to one (k=1). When k=1, the restoration path for a link ui in the primary path must originate at one of the two nodes ui or ui-1. Note that the edges of Q computed from Suurballe's algorithm allow all of the edges except (u7; u8), (u8; u9) and (u9; u10) to have a restoration path with backtracking distance no greater than 1.

For example, the restoration path for failure of link (u8, u9) starts at u5, which requires a backtracking distance of k=3. As such, for the example provided herein, at step 1210, the maximum backtracking distance H exceeds D (i.e., H=3, while D=k=1).

If the computed backtracking distance H does not exceed D, then the Suurballe algorithm may be used as computed, and at step 1212, the method ends and proceeds to step 116 of FIG. 1. However, if at step 1210, the maximum backtracking distance H exceeds D, then the method 114 proceeds to step 1214.

At step 1214, additional restoration paths are computed. That is, procedure maxD (the algorithm of Table 2), checks the maximum backtracking distance and if it exceeds k, additional paths are added to the edges of H. If we add paths P1, P2, and P3, as shown in FIG. 14, to the Gsub, we can obtain an efficient solution that satisfies the backtracking distance constraint. The modified Suurballe algorithm (Line 5) finds such paths in the following way.

For every link (ui, ui+1) in the primary path that does not have a restoration path with backtracking distance bounded by k, we add a path from some node in the set {ui-k, ui-k+1, . . . ui} to reach a node in {ui+1, ui+2, . . . d}. This ensures that we satisfy the requirement for all links on the primary path. Unsatisfied links are processed in the order of their increasing distance to the destination.

Referring to FIG. 14, the exemplary link (u9; u10) is considered first. To satisfy this link, additional paths may be added from either u8 or u9 to reach the node u10. Node u8 is considered first, and if a path to reach u10 is not found, then node u9 is considered. In general, when trying to satisfy link (ui, ui+1), searching for paths starts with ui-k and stops when a path is found. In FIG. 14, an additional path P1 is found from u8. Note that the search for an additional path includes searching for the shortest path at each step, to thereby minimize the cost of the solution. Once a link is satisfied, the procedure is repeated for the next unsatisfied link (farther away from the destination).

Therefore, by adding paths P1, P2, and P3, to the Gsub, an efficient solution is implemented that satisfies D=k and minimizes the bandwidth inefficiency. In the above example, adding path P1 satisfies both links (u9; u10) and (u8; u9), however, the next unsatisfied link is (u7; u8). Adding path P2 satisfies both links (u8; u9) and (u7; u8).

Following the procedure recited above, path P3 at link u6, provides restoration for the link (u7; u8) within the limited backtracking distance k=1, as well as link (u6, u7). The process stops when no remaining unsatisfied links remain. All the paths Pi so obtained combined with the original Q i.e., Gsub={Pi} in the set of Q provides the restoration graph that satisfies required backtracking constraint. By reserving extra bandwidth for the additional paths P1, P2, and P3, the backup load is distributed much more evenly.

In the above procedure a shortest path must be found from a node u of the set of nodes {ui-k, ..., ui} to reach any node in {ui+1, ui+2, ..., d}. This may be implemented by the Dijkstra's algorithm by first shrinking the nodes {ui+1, ui+2, ..., d} into a single super node. In computing the shortest path, the cost of the edges in Gsub currently computed is reduced to zero, so as to make sure that the edges that are already in the solution are reused as much as possible.

FIG. 13 depicts a method 1300 of heuristically computing additional backup paths of the method of FIG. 12. Specifically, FIG. 13 provides the steps for computing extra restoration paths at step 1214 of FIG. 12, and incorporates a heuristic approach that uses graph components. Graph components are defined as a connected subgraph that is disconnected from the rest of the graph. The method 1302 starts at step 1302, and proceeds to step 1304.

At step 1304, the nodes are numbered in the primary path. Specifically, each node in the primary path is numbered as single-node graph components. In the example shown in FIG. 14, ten components u1 to u10 are identified and numbered.

At step 1306, the graph components in backup path are isolated. Specifically, the restoration path is traversed in the reverse direction (i.e., destination node to source node). For each instance where a node also occurs on the primary path, the connected components (nodes and links) on the restoration path between sequential occurrences are assigned to a highest node identifier on the primary path.

In FIG. 14, all of the nodes highlighted (e.g., dark highlighting) belong to components. For example, (u1, v1, v2, v3, u3) form the components in sub-graph G1. The components in sub-graph G2 comprise (u2, v4-v7, u4, v8-v10, and u6). Similarly, the components in sub-graph G3 comprise (u5, v11-v13, and u10).

In other words, vertex numbering is provided. Specifically, vertex numbering begins at the destination node (d=u10). All links in the backup link set are traversed in the reverse direction towards the source node. All the nodes along the backup path are renumbered, until a node along the backup path that forms a new component is reached, where such new component is a connected component that is different from the current one.

In FIG. 14, a new component is formed at node u6. Accordingly, nodes v13, v12, v11, and u5 are associated with c10, which means that these components belong to component u10. That is, component c10 includes nodes u10, v13, v12, v11, u5, and the respective restoration links therebetween. The same procedure is followed for components v10, v9, v8, with u6, until reaching u4. Nodes on the primary path that have both an incoming and outgoing link on the backup graph, i.e., node u4, are treated in a special way. In particular, the component numbering is terminated at such nodes, such that the rest of the G2 is assigned a new component number. This prevents loops in the backup paths. As such, v7, v6, v5, v4, u2, and the respective restoration links therebetween are numbered c4. Similarly, v3, v2, v1, and the respective restoration links therebetween are named c3.

At step 1308, nodes violating the backtracking distance constraint are identified. In particular, the primary path is traversed in the reverse direction, and a node closest to the destination node that violates the backtracking distance (D=k) constraint is located (e.g., u9). At step 1310, the k predecessor is selected (e.g., u8). That is, the node positioned a backtracking distance away from the violating node is selected. In FIG. 14, where the backtracking distance k=1, u8 is selected.

At step 1312, an attempt to compute shortest path from the selected node is made. This shortest path is one of the additional paths, which starts at the selected node (e.g., u8) in the primary path and terminates at a higher numbered node (e.g., v13). In the example shown in FIG. 14, route P1 is formed from u8 to v13. However, if a shortest path computation fails at u8, then an attempt is made to route a path from u9.

At step 1314, the procedure is repeated at u7 and so forth, until the source node s is reached or no nodes that violate D=k constraints exist. For example, skip up to k=1 nodes (u7 in the example) from u8. All the additional paths Pi so obtained are combined with the original Gsub (i.e., Pi∪Gsub provides the restoration graph that satisfies required backtracking constraint). Once the additional paths Pi have been computed, the method 1300 proceeds to step 116 of FIG. 1, where post-processing is performed.

Post-processing is utilized to reduce extra bandwidth reservation for backup paths, thereby saving bandwidth. Specifically, post-processing algorithms are provided for each case of D. The two main goals of these algorithms are to identify for each primary path link, a set of potential restoration paths with minimum backtracking distance, as well as minimize the total bandwidth reserved on the backup paths subject to assignment of restoration paths.

Figure 15A:
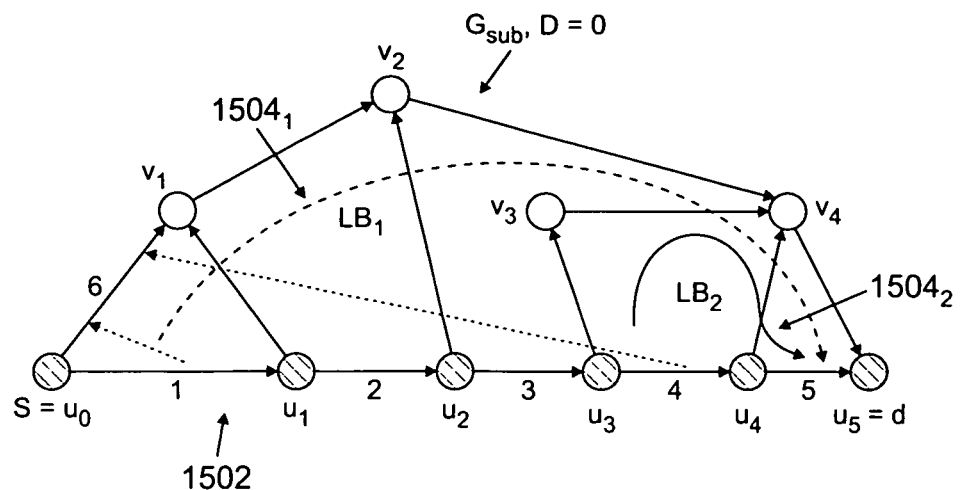
FIG. 15 depicts a schematic diagram illustrating a primary path having a plurality of local restoration paths and a corresponding Steiner tree.
Figure 15B:
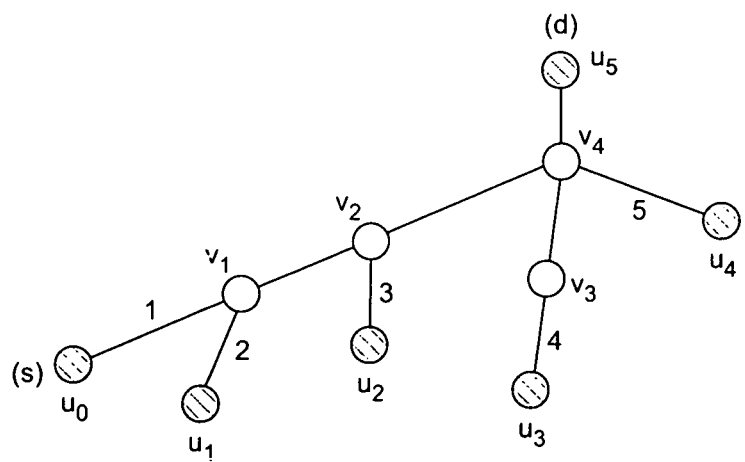

FIG. 15 depicts a schematic diagram illustrating a primary path having a plurality of local restoration paths and a corresponding Steiner tree. FIG. 15 is used in conjunction with the example below to illustrate the need for post-processing. In particular, FIG. 15 depicts a primary path P 1502 comprising nodes (u0; u1; u2; u3; u4; u5) and links 1-5 there between. Further, the corresponding backup sub graph Gsub for D=0 is the reverse of the Steiner tree rooted at u5, as shown in FIG. 15: Here link 1 (u0; u1) is backed up using path LB1 $1504_1$, which comprises links (u0; v1), (v1; v2), (v2; v4) (v4; u5). Link 4 (u3; u4) is backed up by using backup path LB2 $1504_2$ comprising links (u3; v3), (v3; v4), (v4; u5).

For purposes of illustration, assume an exemplary request size b=18 units. Further consider link 6 (u0; v1) on LB1, illustratively having residual bandwidth R6=22 and a backup load A6=32. Moreover, the backup load illustratively induced by link 4 on link 6 is BLDM[6; 4]=20, while the backup load induced by link 1 on link 6 is BLDM[6; 1]=10.

Unfortunately, when the link cost (wl) is assigned for Steiner tree computation, a pessimistic assumption is made. Specifically, the worst-case backup load on link 6, which is induced by link 4, is 20 units. This worst-case approach accounts for a possibility that the backup path for link 4 may be included in link 6. As such, the extra bandwidth reservation on link 6 is b−(A6−BLDM[6; 4]) or (18−(32−20))=6 units. In other words, the free bandwidth (FR) and correspondingly backup link costs (wl) assigned in the Steiner tree computation are rather conservative, as they assume that any candidate link in backup graph may have to backup worst-case load from a link in the primary path. Providing post-processing after computation of the Steiner tree and path selection, helps reduce extra bandwidth reservation for backup paths, and therefore saves bandwidth.

Figure 16:
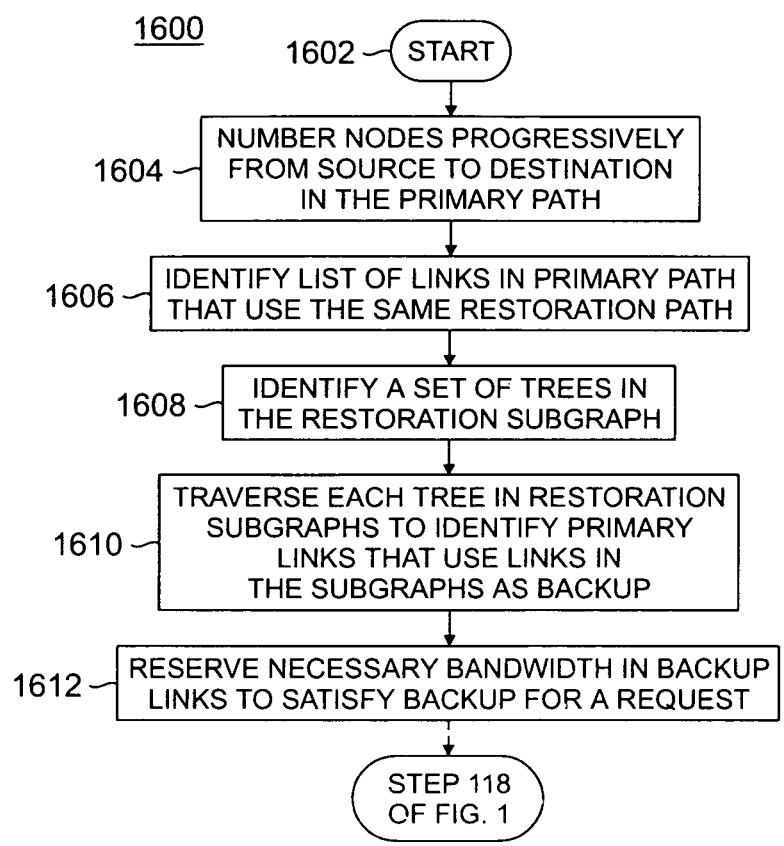
FIG. 16 depicts a flow chart of a method for providing post-processing after computing the costs for reserving a restoration path.

FIG. 16 depicts a flow chart of a method 1600 for providing post-processing after computing costs for reserving a restoration path. The method 1600 starts at step 1602 and proceeds to step 1604, where the nodes in the primary path 1502 are sequentially numbered beginning at the source node (e.g., u0) and numbering towards the destination node (e.g., u5).

At step 1606, the links in the primary path that activate a restoration (backup) path are identified. That is, at step 1606 the links in the primary path that use the same restoration path are identified. Referring to FIG. 15, since D=0, each link on the primary path activates a restoration path. At step 1608, the set of trees in the backup subgraph are identified. In the example of FIG. 15, the backup subgraph is a Steiner tree. That is, the backup subgraph contains only one tree. Specifically, for primary path link 5 (u4, u5), the restoration path is u4, v4, u5. For primary path link 4 (u3, u4), the restoration path is (u3, v3, v4, u5 (LB2)). The restoration path for primary path link 3 (u2, u3) is (u2, v2, v4, u5), while the restoration path for primary path link 2 is (u1, u2) is (u1, v1, v2, v4, u5). The fifth restoration path for primary path link 1 (u0, u1) is (u0, v1, v2, v4, u5 (LB1)).

At step 1610, each tree is traversed to identify the primary links that use links in the sub graphs as backup. For example, in FIG. 15, primary link 1 (u0,u1) uses backup links (u0,v1), (v1,v2), (v2,v4) and (v4,u5), while primary link 3 (u2, u3) uses links (u2,v2), (v2,v4), and so forth. It is noted that in the example of FIG. 15, component v4 is used in all of the backup paths.

In the example of FIG. 15, post-processing accounts for the fact that only backup path LB1 for link 1 uses link 6. Accordingly, the amount of free bandwidth on link 6 (A6−BLDM[6; 2])=32−10=22, which is greater than the request size (b=18). Thus, no extra bandwidth has to be reserved on link 6. Once the required bandwidth is determined for a particular backup link, at step 1612, the necessary bandwidth is reserved in the backup links to satisfy restoration for a particular request. As such, post processing of the solution can reduce extra bandwidth reservation for backup paths and therefore save bandwidth.

Specifically, for a given primary path P, the backup sub graph Gsub that the post processing algorithms compute is termed a "forest" consisting a set of trees {Ti}. The amount of bandwidth needed to be reserved can be computed optimally by a single traversal of the primary path P and one ordered traversal of each tree Ti. The backup paths for each primary edge can be found in time linear in the size of the tree and the output size.

The post-processing algorithms for D=∞ and D=k are conceptually similar to the case D=0. However, for a given link (ui; ui+1) in the primary path P, several restoration paths may satisfy the backtracking constraint. By choosing a restoration path with the minimum backtracking distance, the restoration path for each link is uniquely defined. Further, instead of a single tree as in the D=0 case, each of these trees in the backup subgraph is processed in a similar manner as described regarding the D=0 case.

Although various embodiments that incorporate the teachings of the present invention have been shown and described in detail herein, those skilled in the art can readily devise many other varied embodiments that still incorporate these teachings.

What is claimed is:

1. A method of providing at least one restoration path for a primary routing path in a network, comprising:
   receiving, at a node, a customer connection request to route information;
   assigning costs for said primary routing path, wherein said assigning costs for said primary routing path comprises:
      identifying link bandwidth capacity for all links in a flooding scope;
      identifying an amount of bandwidth reserved on each link by primary paths in the flooding scope;
      identifying an amount of bandwidth reserved on each link by restoration paths in the flooding scope; and
      identifying residual bandwidth capacity for each link in the flooding scope;
   computing said primary routing path based upon said primary routing path costs;
   determining a backtracking distance over said primary routing path, wherein said backtracking distance is a maximum distance along the primary routing path within which said at least one restoration path can originate;
   assigning costs for said at least one restoration path; and
   computing said at least one restoration path based upon said at least one restoration path costs.

2. The method of claim 1, wherein said receiving step comprises receiving a tunnel request identifying a source node, a destination node, and bandwidth requirement information.

3. The method of claim 1, further comprising identifying a backup load distribution matrix based upon said bandwidth reserved by said primary and restoration paths, and said residual bandwidth capacity.

4. The method of claim 1, wherein said computing said primary routing path step comprises selecting links utilizing minimal bandwidth to satisfy predetermined time constraints.

5. The method of claim 1, wherein said computing said primary routing path step comprises selecting links utilizing a shortest path algorithm.

6. The method of claim 5, wherein said shortest path algorithm is selected from a group comprising an open shortest path first (OSPF) algorithm, a Dijkstra algorithm, a widest shortest path first (WSPF) algorithm, minimum interference routing, and profile based routing (PBR).

7. A method of providing at least one restoration path for a primary routing path in a network, comprising:
   receiving, at a node, a customer connection request to route information;
   assigning costs for said primary routing path;
   computing said primary routing path based upon said primary routing path costs;
   determining a backtracking distance over said primary routing path, wherein said backtracking distance is a maximum distance along the primary routing path within which said at least one restoration path can originate, wherein said determining said backtracking distance over said primary routing path comprises determining bandwidth and restoration latency tolerances associated with said request, wherein said determining a backtracking distance over said primary routing path further comprises:
  acquiring restoration latency requirements (t_r) by the requesting entity;
  acquiring network latency information including fault detection time (t_f) and maximum fault propagation time (t_p) among the links in the primary path; and
  computing said backtracking distance D, where D is less than or equal to $((t\_r)-(t\_f))/(t\_p)$;
assigning costs for said at least one restoration path; and
computing said at least one restoration path based upon said at least one restoration path costs.

8. The method of claim 7, wherein said backtracking distance shares links amongst the primary path and the restoration paths.

9. The method of claim 7, where in an instance where the backtracking distance is zero (D=0), the at least one restoration path originates at a node at which a failed link originates.

10. The method of claim 7, where in an instance where the backtracking distance is unlimited (D=∞), the at least one restoration path may originate at any prior node of the primary routing path.

11. The method of claim 7, where in an instance where the backtracking distance is limited ((D=k), where k is an integer greater than zero, but not unlimited), the at least one restoration path may originate at a prior node on the primary routing path up to k links away from a subsequent node that owns a failed link.

12. The method of claim 7, where said backtracking distance is heuristically determined, comprising the steps of:
  identifying a set of nodes for generating the primary path and restoration paths without backtracking (D=0);
  computing a directed Steiner tree, where said Steiner tree finds a shortest path from a root node to other nodes; and
  reversing all edges of the Steiner tree.

13. The method of claim 7, where said backtracking distance is heuristically determined comprising the steps of:
  identifying a set of nodes for generating the primary path and restoration paths with unlimited backtracking (D=∞); and
  performing the Suurballe algorithm, where said Suurballe algorithm further comprises:
    reversing primary path link direction;
    assigning primary path link costs to zero;
    assigning costs to links not associated with the primary path; and
    selecting the at least one restoration path utilizing a shortest path algorithm.

14. The method of claim 7, where said backtracking distance is heuristically determined comprising the steps of:
  identifying a set of nodes for generating the primary path and restoration paths with limited backtracking ((D=k), where k is an integer greater than zero, but not unlimited);
  performing the Suurballe algorithm;
  determining whether all links in the primary path are within the backtracking distance k; and
  computing additional restoration paths for those links in the primary path not within the backtracking distance k.

15. The method of claim 14, wherein said computing additional restoration paths for those links in the primary path not within the backtracking distance D=k comprises:

a) sequentially numbering nodes in said primary path;
b) traversing said restoration path in a reverse direction, and for each instance where a node in the restoration path is also occurs on the primary path, assigning connected components on the restoration path between sequential occurrences on the primary path to a highest node identifier in the primary path.
c) progressively traversing the primary path in a reverse direction, and identifying a node on the primary path closest to the destination node that violates the backtracking distance constraint;
d) selecting a node said backtracking distance away from the violating node;
e) computing a shortest path from the selected node on the primary path as one of said additional restoration paths, such that said additional restoration path terminates with a higher numbered node; and
repeating steps (c) through (e) until no further nodes on the primary path violate the backtracking distance constraint.

16. The method of claim 1, further comprising performing post processing to free excess bandwidth reserved on each restoration path and minimize bandwidth usage on each restoration path.

17. The method of claim 16, wherein said post processing comprises:
  sequentially numbering nodes from a source node to a destination node along the primary path;
  identifying links in the primary path that initiate a restoration path;
  identifying a set of trees in a restoration subgraph;
  traversing each tree to identify primary links that also use links in the restoration paths; and
  reserving necessary bandwidth in restoration links to satisfy restoration for a given request.

18. The method of claim 17, further comprising
  selecting a restoration path having a minimum backtracking distance for each primary link.

19. A non-transitory computer readable storage medium storing software instructions that, when executed by a processor, cause the processor to perform a method of providing at least one restoration path for a primary routing path in a network, the method comprising:
  receiving a customer connection request to route information;
  assigning costs for said primary routing path, wherein said assigning costs for said primary routing path comprises:
    identifying link bandwidth capacity for all links in a flooding scope;
    identifying an amount of bandwidth reserved on each link by primary paths in the flooding scope;
    identifying an amount of bandwidth reserved on each link by restoration paths in the flooding scope; and
    identifying residual bandwidth capacity for each link in the flooding scope;
  computing said primary routing path based upon said primary routing path costs;
  determining a backtracking distance over said primary routing path, wherein said backtracking distance is a maximum distance along the primary routing path within which said at least one restoration path can originate;
  assigning costs for said at least one restoration path; and
  computing said at least one restoration path based upon said at least one restoration path costs.

* * * * *